(12) United States Patent
Kamon et al.

(10) Patent No.: US 8,388,035 B2
(45) Date of Patent: Mar. 5, 2013

(54) ROBOT HAND

(75) Inventors: Masayuki Kamon, Akashi (JP); Sadao Kubo, Akashi (JP); Yuuki Takayama, Kobe (JP); Hitoshi Hasunuma, Kobe (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 0 days.

(21) Appl. No.: 13/054,307

(22) PCT Filed: Jul. 17, 2009

(86) PCT No.: PCT/JP2009/003372
§ 371 (c)(1),
(2), (4) Date: Jan. 14, 2011

(87) PCT Pub. No.: WO2010/007795
PCT Pub. Date: Jan. 21, 2010

(65) Prior Publication Data
US 2011/0115244 A1 May 19, 2011

(30) Foreign Application Priority Data
Jul. 17, 2008 (JP) .................... 2008-185843

(51) Int. Cl.
*B25J 15/08* (2006.01)
(52) U.S. Cl. ........................ 294/106; 294/213
(58) Field of Classification Search ............... 294/106, 294/111, 103.1, 104, 119.1, 198, 213; 901/28, 901/30, 31
See application file for complete search history.

(56) References Cited

U.S. PATENT DOCUMENTS

| | | | | |
|---|---|---|---|---|
| 3,139,302 A | * | 6/1964 | Orloff et al. ................ | 294/198 |
| 3,698,757 A | * | 10/1972 | Smith ......................... | 294/119 |
| 3,759,563 A | * | 9/1973 | Kitamura ..................... | 294/198 |
| 4,368,913 A | * | 1/1983 | Brockmann et al. ......... | 294/106 |
| 5,588,688 A | * | 12/1996 | Jacobsen et al. ............. | 294/106 |

FOREIGN PATENT DOCUMENTS

| | | |
|---|---|---|
| JP | A 10-006266 | 1/1998 |
| JP | A 2002-326128 | 11/2002 |
| JP | A 2005-144582 | 6/2005 |

OTHER PUBLICATIONS

International Preliminary Report on Patentability issued in PCT/JP2009/003372, issued Feb. 8, 2011.
International Search Report issued in PCT/JP2009/003372, mailed Aug. 18, 2009. (with English-language translation).

* cited by examiner

*Primary Examiner* — Paul T Chin
(74) *Attorney, Agent, or Firm* — Oliff & Berridge, PLC

(57) ABSTRACT

A robot hand is configured such that a plurality of finger mechanisms are disposed on base and operate so as to cause fingertip portions thereof to get close to each other and separate from each other. At least one of the plurality of finger mechanisms is constituted by a Chebychev link mechanism including a driving link configured to be rotated about a base end portion thereof supported by the base, a driven link having a base end portion coupled to the base so as to be swingable, and an intermediate link having a base end portion coupled to a tip end portion of the driving link so as to be swingable and a center portion coupled to a tip end portion of the driven link so as to be swingable. The fingertip portions are respectively provided at tip end portions of the intermediate links.

5 Claims, 13 Drawing Sheets

_(1)_
ROBOT HAND

TECHNICAL FIELD

The present invention relates to a robot hand configured such that a plurality of finger mechanisms are provided on a base.

BACKGROUND ART

A robot hand includes a plurality of finger mechanisms configured such that fingertip portions thereof get close to each other and separate from each other. The robot hand can hold a work by reducing a mutual interval between the fingertip portions. As disclosed in PTL 1, examples of a conventional finger mechanism are a simple rotary type, a parallel link type, and a linear type.

A simple rotary type finger mechanism 900 shown in FIG. 9A includes a pair of swinging links 911, each having a base end portion pivotally supported by a base 901. Tip end portions of the swinging links 911 are fingertip portions 915. When the swinging links 911 swing by motors, not shown, the mutual interval between the fingertip portions 915 changes.

A parallel link type finger mechanism 920 shown in FIG. 9B includes driving links 931 and driven links 932, each having a base end portion pivotally supported by a base 921. Tip end portions of the driving links 931 and driven links 932 are pivotally supported by holding members 933. The driven link 932 extends in parallel with the driving link 931. The holding members 933 are fingertip portions 935. When the driving links 931 swing by motors not shown, the driven links 932 also swing, and this changes the mutual interval between the fingertip portions 935.

A linear type finger mechanism 940 shown in FIG. 9C includes a ball screw 951 having one end portion at which a right-hand thread is formed and the other end portion at which a left-hand thread is formed. A pair of linearly moving links 952 are threadedly engaged with respective end portions of the ball screw 951 so as not to be rotatable. Tip end portions of the linearly moving links 952 are fingertip portions 955. The ball screw 951 is rotatably supported by bearings 942 provided at a base 941 and is coupled via a coupling member 943 to a motor 944 attached to an outer surface of the base 941. When the ball screw 951 is rotated by the motor 944, the linearly moving links 952 linearly move on the ball screw 951, and this changes the mutual interval between the fingertip portions 955.

CITATION LIST

Patent Literature

PTL 1: Japanese Laid-Open Patent Application Publication No. 10-6266

SUMMARY OF INVENTION

Technical Problem

Each of the simple rotary type and the parallel link type is advantageous in that the size of the base can be set to be smaller than a maximum value of the mutual interval between the fingertip portions. With this, the entire robot hand can be reduced in size.

FIG. 10 is a diagram for explaining a holding operation of a work by utilizing the finger mechanism shown in FIG. 9B. Although the parallel link type finger mechanism 920 has the above advantage, as shown in FIG. 10, the heights of the fingertip portions 935 change by the change in the mutual interval between the fingertip portions 935. Therefore, in a case where the parallel link type finger mechanism 920 tries to hold a thin work 970, and the fingertip portions 935 get too close to a supporting surface 971, the fingertip portions 935 hit the supporting surface 971 which supports the work 970. In contrast, in a case where the fingertip portions 935 are separated from the supporting surface 971 to avoid the hitting, the fingertip portions 935 may fail to hold the work 970. In order to avoid both of these, it is necessary to control the robot to appropriately set a clearance between the fingertip portion 935 and the supporting surface 971. Thus, the problem is that the robot cannot easily hold the work.

Moreover, in the case of the simple rotary type, when the swinging links are operated to reduce the mutual interval between the fingertip portions to hold the work, the heights of the fingertip portions change, and the postures of the fingertip portions also change. Therefore, the same problem as the parallel link type occurs.

In contrast, the linear type is advantageous in that the heights and postures of the fingertip portions can be maintained constant regardless of the mutual interval between the fingertip portions. With this, the robot can easily hold the work. However, as shown in FIG. 9C, the linear type cannot avoid the configuration in which the size of the base becomes larger than the maximum value of the mutual interval between the fingertip portions. Therefore, the entire robot hand increases in size.

Here, an object of the present invention is to reduce the size of a robot hand, and another object of the present invention is to provide a robot hand capable of easily holding a work.

Solution to Problem

A robot hand according to the present invention is a robot hand configured such that a plurality of finger mechanisms are disposed on a base and operate so as to cause fingertip portions thereof to get close to each other and separate from each other, wherein: at least one of the plurality of finger mechanisms is constituted by a Chebychev link mechanism including a driving link configured to be rotated about a base end portion thereof supported by the base, a driven link having a base end portion coupled to the base so as to be swingable, and an intermediate link having a base end portion coupled to a tip end portion of the driving link so as to be swingable and a center portion coupled to a tip end portion of the driven link so as to be swingable; and the fingertip portion is provided at a tip end portion of the intermediate link.

In accordance with the present configuration, the movement trajectory of the fingertip portion corresponds to the movement trajectory of the tip end portion of the intermediate link of the Chebychev link mechanism. In accordance with the principle of the Chebychev link mechanism, the fingertip portion can move in a range larger than a distance between the base end portion of the driving link supported by the base and the base end portion of the driven link, and the maximum value of the mutual interval between the fingertip portions can be set to be larger than the size of the base. Therefore, the entire robot hand can be reduced in size. Here, the Chebychev link mechanism is a mechanism including four links. In accordance with the present configuration, the base coupled to the base end portions of the driving link and driven link serves as the last one link.

It is preferable that the driving link be configured to be rotatable in a predetermined angular range such that a movement trajectory of the fingertip portion of the finger mechanism constituted by the Chebychev link mechanism corresponds to a straight portion of a circumferential movement trajectory along which the intermediate link as the Chebychev link mechanism is able to move. In accordance with the present configuration, the heights of the fingertip portions do not change regardless of the mutual interval between the fingertip portions. Therefore, the fingertip portions can easily hold the work.

It is preferable that the driving link include a pair of rib portions sandwiching the base end portion of the intermediate link, and the base end portion of the intermediate link be supported by the pair of rib portion from both sides thereof. In accordance with this configuration, strength for supporting a load acting in a rotation axis direction on the tip end side of the intermediate link can be increased.

It is preferable that the finger mechanism constituted by the Chebychev link mechanism further include: a joint member disposed at a coupled portion where the driven link and the intermediate link are coupled to each other; a first parallel link arranged in parallel with the driven link and coupled to the base and the joint member so as to be swingable; a holding member coupled to the tip end portion of the intermediate link so as to be swingable and configured as the fingertip portion; and a second parallel link arranged in parallel with the intermediate link and coupled to the joint member and the holding member so as to be swingable. In accordance with the present configuration, the joint member is restricted by the first parallel link and operates without changing its posture, and the holding member is restricted by the second parallel link and operates without changing its posture. To be specific, the finger mechanism has a structure in which the Chebychev link mechanism is combined with the parallel link mechanism. In accordance with the present configuration, since the fingertip portion is formed at the holding member, the postures of the fingertip portions do not change regardless of the mutual interval between the fingertip portions. Therefore, the fingertip portions can easily hold the work.

It is preferable that at least one of the driven link, the intermediate link, and the first parallel link include a pair of side wall portions sandwiching the joint member, and the joint member be supported by the pair of side wall portions from both sides thereof. In accordance with this configuration, the strength for supporting the load acting in the rotation axis direction on the link extending toward the tip end side of the joint member can be increased. Moreover, it is preferable that at least one of the intermediate link and the second parallel link include a pair of side wall portions sandwiching the holding member, and the holding member be supported by the pair of side wall portions from both sides thereof. In accordance with this configuration, the strength for supporting the load acting in the rotation axis direction on the tip end side of the holding member can be increased.

It is preferable that the holding member extend from the tip end portion of the intermediate link to a side where the other finger mechanism is arranged. In accordance with this configuration, the minimum value of the mutual interval between the fingertip portions can be reduced without increasing the thickness of the holding member and decreasing an arrangement interval between the finger mechanisms. Thus, the fingertip portions can hold the work having a small width.

Each of at least two of the finger mechanisms may be constituted by the Chebychev link mechanism, and at least the driving links may be arranged so as to be displaced in a rotation axis direction such that the driving links overlap each other in the predetermined rotation angular range when projected in the rotation axis direction. In accordance with this configuration, in a case where each of both two finger mechanisms is constituted by the Chebychev link mechanism, the mutual interval between the driving links can be reduced, so that the entire robot hand can be reduced in size.

The robot hand may include at least two motors configured to respectively output rotary driving forces to the driving links, rotating shafts of the driving links of the finger mechanisms may be arranged in parallel with each other, and the motors may be arranged on a same side of the base. In accordance with this configuration, the motors can be collectively arranged, so that the entire robot hand can be reduced in size.

The base may include a stay portion to which a robot arm is coupled, and the motors may be arranged on a side where the stay portion extends. In accordance with this configuration, the structure to which the robot arm is attached and the motors can be collectively arranged, so that the entire robot hand can be reduced in size.

The above object, other objects, features and advantages of the present invention will be made clear by the following detailed explanation of preferred embodiments with reference to the attached drawings.

Advantageous Effects of Invention

As above, in accordance with the present invention, the robot hand can be reduced in size.

DESCRIPTION OF EMBODIMENTS

Figure 1:
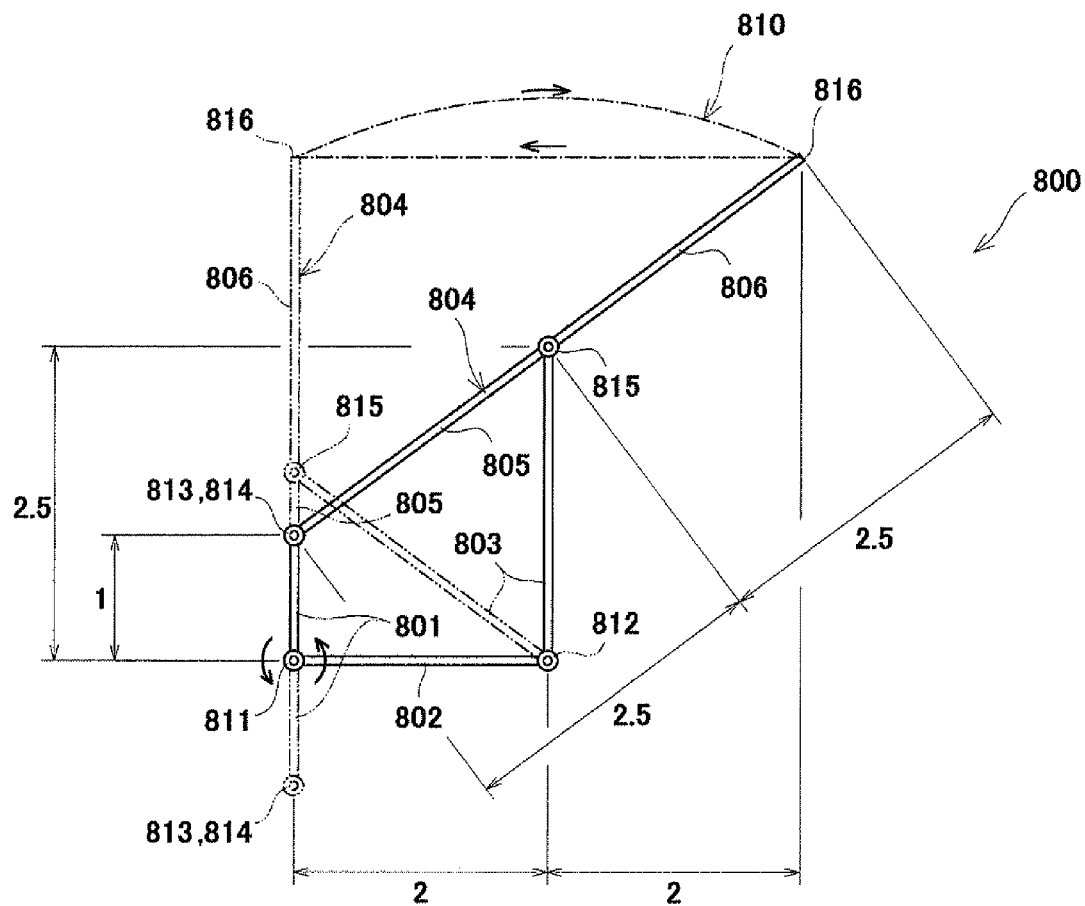
FIG. 1 is an explanatory diagram of a Chebychev link mechanism utilized in a finger mechanism according to the present invention.

Hereinafter, embodiments of the present invention will be explained in reference to the attached drawings.

Chebychev Link Mechanism

First, a known Chebychev link mechanism applied to a finger mechanism according to the present invention will be explained based on FIG. 1. A Chebychev link mechanism 800 includes four links that are a driving link 801, a fixed link 802, a driven link 803, and an intermediate link 804 and operates by input of a rotary driving force to a base end 811 of the driving link 801. The fixed link 802 fixes the position of a base end 812 of the driven link 803 with respect to the base end 811 of the driving link 801. Each of the base end 811 of the driving link 801 and the base end 812 of the driven link 803 is coupled to the fixed link 802 so as to be swingable. A base end 813 of the intermediate link 804 is coupled to a tip end 814 of the driving link 801 so as to be swingable, and a tip end 815 of the driven link 803 is coupled to a center portion of the intermediate link 804 so as to be swingable. To be specific, the intermediate link 804 includes a base end side extending portion 805 and a tip end side extending portion 806. The base end side extending portion 805 extends on a base end side of a coupled portion where the driven link 803 is coupled to the intermediate link 804, the base end side being coupled to the driving link 801. The tip end side extending portion 806 extends on a side opposite to the base end side. A tip end of the tip end side extending portion 806 is a tip end 816 of the intermediate link 804.

In a case where the length of the driving link 801 is "1", the length of the fixed link 802 is "2", the length of the driven link 803 is "2.5", and the length of the intermediate link 804 is "5". Moreover, the lengths of the base end side extending portion 805 and tip end side extending portion 806 of the intermediate link 804 are the same as each other and are "2.5" each.

As shown in FIG. 1, it is assumed that the fixed link 802 is horizontally provided on a lower side, and the driven link 803 is provided on a right side of the driving link 801. As shown by solid lines, when the driving link 801 stands upward with respect to the fixed link 802, the tip end 816 of the intermediate link 804 is located farthest from the base end 811 of the driving link 801 in a horizontal direction. When the length of the driving link 801 is "1", a horizontal distance between the base end 811 of the driving link 801 and the tip end 816 of the intermediate link 804 is "4", that is, this horizontal distance is twice the length of the fixed link 802. When the driving link 801 rotates counterclockwise from this standing state, the intermediate link 804 itself changes its posture, and the tip end 816 of the intermediate link 804 linearly moves to the left.

As shown by chain double-dashed lines, this movement continues until the driving link 801 hangs downward. In this hanged state, the horizontal distance between the base end 811 of the driving link 801 and the tip end 816 of the intermediate link 804 becomes zero. In a period from when the driving link 801 further rotates until when the driving link 801 becomes the standing state again, the tip end 816 of the intermediate link 804 moves so as to make a curve while increasing the horizontal distance between the tip end 816 of the intermediate link 804 and the base end 811 of the driving link 801.

As above, in accordance with the Chebychev link mechanism 800, while the driving link 801 rotates once, the tip end 816 of the intermediate link 804 moves along a circumferential movement trajectory 810 in a certain plane. When a rotation angle of the driving link 801 in the standing state is defined as 0 degree and a counterclockwise rotational direction is defined as a positive rotational direction and the rotation angle is between 0 degree and 180 degrees, the trajectory 810 of the movement of the tip end of the intermediate link 804 by the rotational movement of the driving link 801 corresponds to a straight line extending substantially in parallel with a direction in which the fixed link 802 extends.

Embodiment 1

Figure 2:
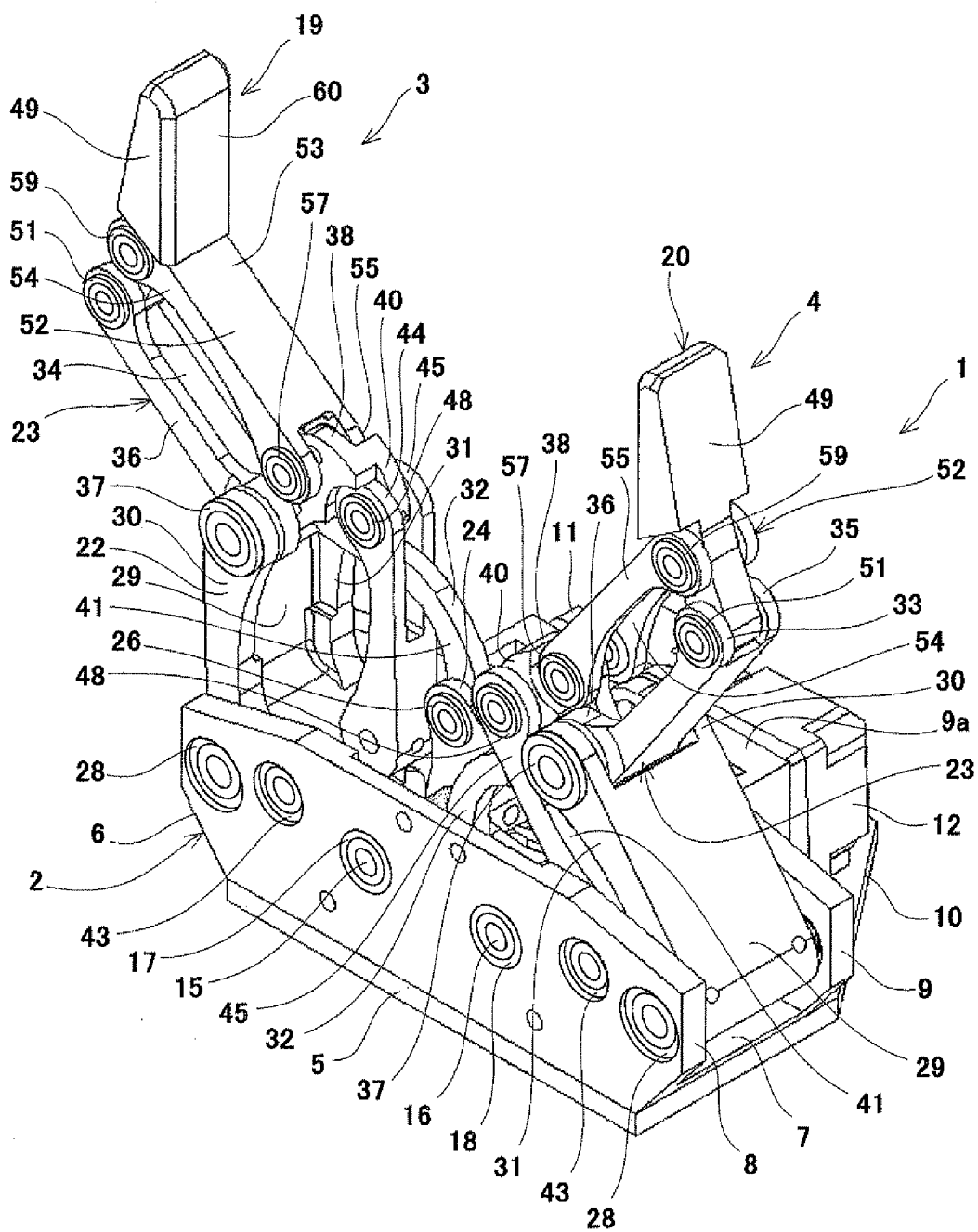
FIG. 2 is a perspective view of a robot hand according to Embodiment 1 of the present invention.
Figure 3:
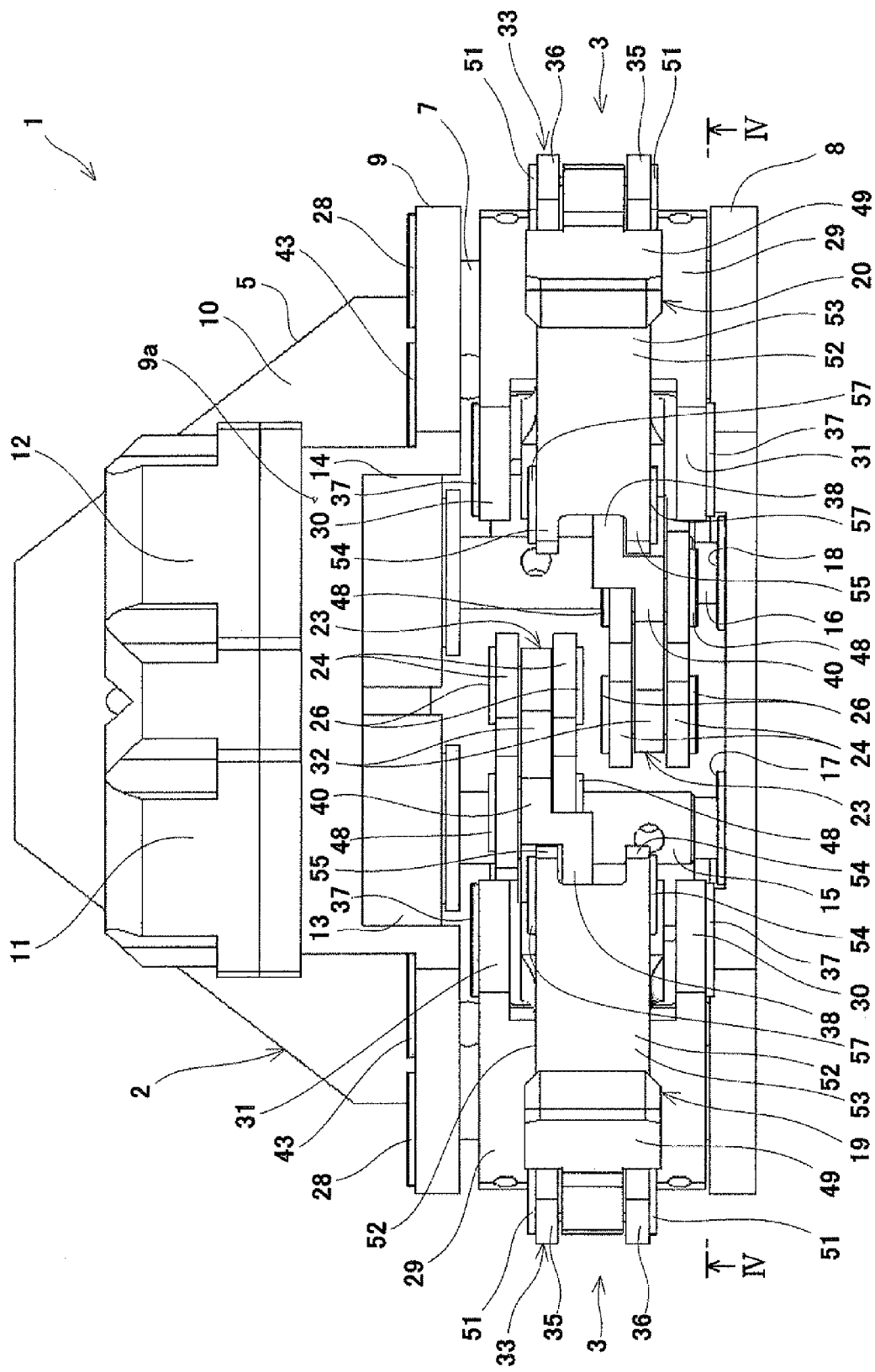
FIG. 3 is a plan view of the robot hand according to Embodiment 1 of the present invention.

FIG. 2 is a perspective view of a robot hand according to Embodiment 1 of the present invention, and FIG. 3 is a plan view thereof. A robot hand 1 shown in FIGS. 2 and 3 includes a base 2 and a plurality of (two in the present embodiment) finger mechanisms 3 and 4. In the following explanation, a direction in which a fingertip portion 19 of the finger mechanism 3 and a fingertip portion 20 of the finger mechanism 4 are opposed to each other and move is defined as a left-right direction.

The base 2 is configured such that a supporting member 6 is joined to a flat plate-shaped base member 5. The supporting member 6 is formed to have a U-shaped cross section and includes a bottom wall 7 joined to the base member 5 and a pair of side walls 8 and 9 standing vertically from the bottom wall 7. The base member 5 includes a stay portion 10 extending toward a far side of the supporting member 6, and a robot arm, not shown, is coupled to a bottom surface of the stay portion 10.

A longitudinally center portion of the side wall 9 located on the far side projects toward the far side. Two motors 11 and 12 configured to respectively drive the finger mechanisms 3 and 4 are lined up in the left-right direction to be fixed to an outer surface of a projecting portion 9a of the side wall 9. Each of the motors 11 and 12 are, for example, a servo motor, and side surfaces of housings of the motors 11 and 12 contact each other in the left-right direction. The motors 11 and 12 are controlled by a controller, not shown, so as to perform positive and negative rotations. In addition, each of the motors 11 and 12 may be controlled by the controller, not shown, so as to be stopped at a desired rotational position.

As above, the motors 11 and 12 are collectively arranged on the far side of the base 2. Therefore, the entire hand can be reduced in size as compared to a case where one of the motors is attached to the side wall 8 located on a near side whereas the other motor is attached to the side wall 9 located on the far side. In addition, both of the motors 11 and 12 are fixed to the side wall 9 located on the far side where the stay portion 10 extends, and overlap the stay portion 10 in plan view. As above, the motors 11 and 12 are collectively arranged together with a structure for attaching the robot arm, so that the entire hand can be reduced in size.

As shown in FIG. 3, an output shaft of the motor 11 is coupled to a rotating shaft 15 via a coupling member 13, and an output shaft of the motor 12 is coupled to a rotating shaft 16 via a coupling member 14. Each of the rotating shafts 15 and 16 extends between the side walls 8 and 9 in a direction perpendicular to the side walls 8 and 9. Each of the coupling members 13 and 14 are accommodated in a concave portion formed inside the projecting portion 9a of the side wall 9. Near-side end portions of the rotating shafts 15 and 16 are respectively and rotatably supported by bearings 17 and 18 incorporated in the side wall 8 located on the near side.

The finger mechanisms 3 and 4 are supported by the rotating shafts 15 and 16 and the side walls 8 and 9 of the base 2. The finger mechanisms 3 and 4 are constituted by the same parts and are rotationally symmetric through 180 degrees about an axis extending between the rotating shafts 15 and 16 in a direction perpendicular to the base member 5.

Base portions of the finger mechanisms 3 and 4 are arranged at a space between the side walls 8 and 9, and the fingertip portions 19 and 20 of the finger mechanisms 3 and 4 are arranged to project from the base 2 and be opposed to each other in the left-right direction.

The finger mechanisms 3 and 4 operate such that the fingertip portions 19 and 20 separate from each other or get close to each other in accordance with the rotational directions of the rotating shafts 15 and 16 which rotate by the driving of the motors 11 and 12. In order to realize such operation, the above-described Chebychev link mechanism is applied to each of the finger mechanisms 3 and 4 of the present embodiment.

Figure 4:
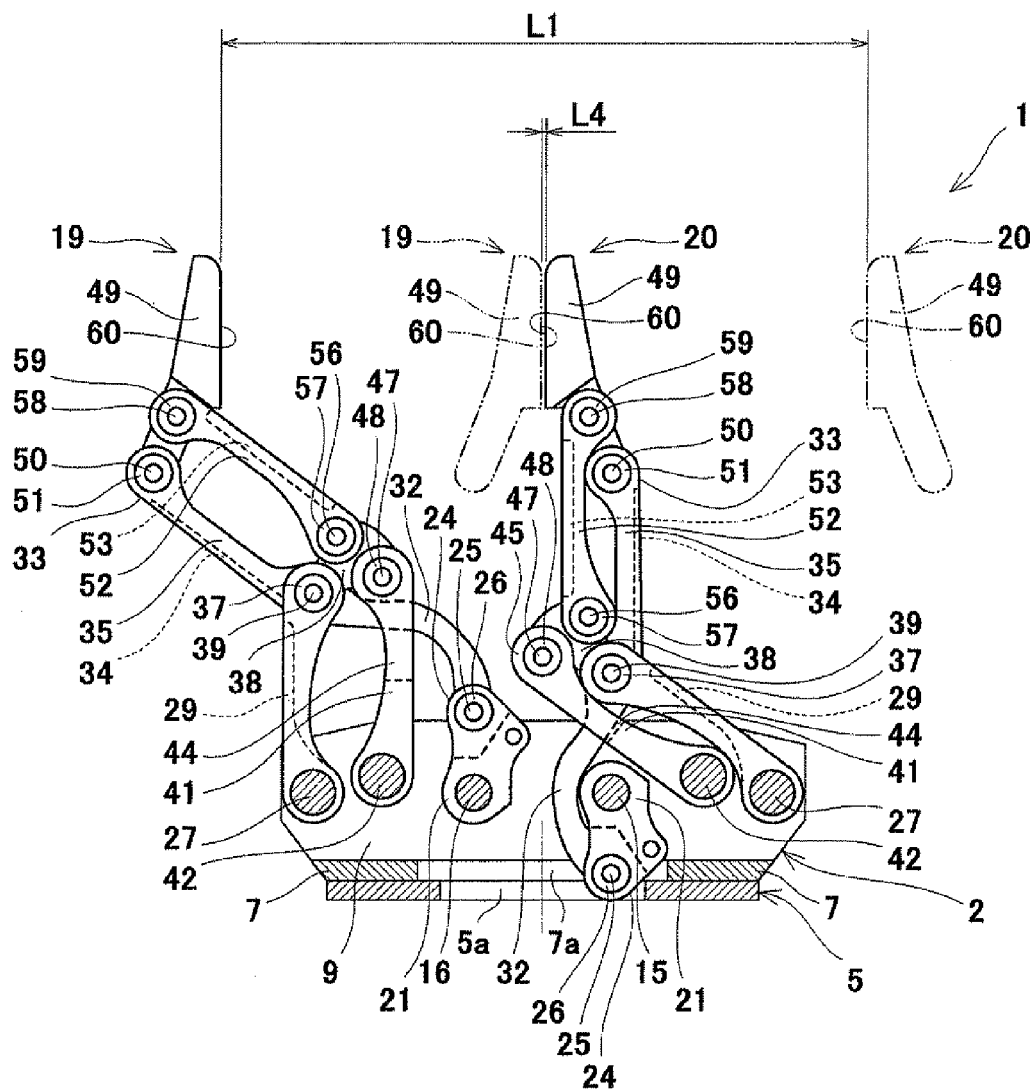
FIG. 4 is a cross-sectional view taken along line IV-IV of FIG. 3 and is a front view of the robot hand.

FIG. 4 is a cross-sectional view taken along line IV-IV of FIG. 3 and is a front view showing an internal structure between the side walls 8 and 9. Hereinafter, the configurations of the finger mechanisms 3 and 4 will be explained in reference to FIGS. 2 to 4.

Each of the finger mechanisms 3 and 4 includes a driving link 21, a driven link 22, and an intermediate link 23, which are components of the Chebychev link mechanism.

Each of base end portions of the driving links 21 shown in FIGS. 3 and 4 is formed to have a cylindrical shape, and the corresponding rotating shafts 15 and 16 are respectively inserted through the base end portions of the driving links 21. The driving links 21 are fixed to the corresponding rotating shafts 15 and 16 and rotate integrally with the corresponding rotating shafts 15 and 16. Each of the driving links 21 includes a pair of rib portions 24 that are tip end portions thereof. A dotted line in the driving link 21 shown in FIG. 3 is an outline defining a base end of the rib portion 24. An outer surface of the rib portion 24 and a side surface of the base end portion form the same surface. A base end portion of the intermediate link 23 is sandwiched between the rib portions 24. A pin 25 projecting in parallel with an axial direction of the rotating shaft 15 is provided at both side surfaces of the base end portion of the intermediate link 23. The pin 25 is rotatably supported by bearings 26 incorporated in the rib portions 24. As above, the base end portion of the intermediate link 23 is coupled to the tip end portion of the driving link 21 at both sides thereof so as to be swingable. Moreover, the base end portion of the intermediate link 23 is supported by the rib portions 24 at both sides thereof. Therefore, strength for supporting a load received by a tip end side of the intermediate link 23 in a rotation axis direction increases, and durability of the robot hand 1 improves.

The base end portion of the driven link 22 is formed to have a cylindrical shape, and an axial length thereof is substantially equal to a mutual interval between the side walls 8 and 9. A pin 27 (see FIG. 4) projecting in parallel with the rotation axis direction is provided at both side surfaces of the base end portion of the driven link 22. The pin 27 is rotatably supported by bearings 28 (see FIGS. 2 and 3) incorporated in the end portions of the side walls 8 and 9 in the left-right direction. As above, the base end portion of the driven link 22 is coupled to the side walls 8 and 9 of the base 2 so as to be swingable. Moreover, the position of the base end portion of the driven link 22 is fixed with respect to the position of the base end portion of the driving link 21 via the side walls 8 and 9. To be specific, each of the side walls 8 and 9 of the base 2 of the robot hand 1 serves as a fixed link, which is one of components of the Chebychev link mechanism.

An intermediate portion of the driven link 22 is formed to have a U-shaped cross section. The intermediate portion of the driven link 22 includes: a flat plate-shaped base portion 29 which smoothly extends from an outer peripheral surface of the base end portion; and a pair of side wall portions 30 and 31, each extending integrally from the side surface of the base end portion. The width of the base portion 29 is equal to the axial length of the base end portion. Each of the side wall portions 30 and 31 is formed so as to be bent perpendicularly from an edge of the base portion 29.

The intermediate link 23 includes: a base end side extending portion 32 extending from the base end portion coupled to the driving link 21; and a tip end side extending portion 33 connected to the base end side extending portion 32.

As shown in FIG. 3, because of reasons described later, the driving link 21 of the finger mechanism 3 located on the left side is located on the far side between a pair of side walls 8 and 9, and the driving link 21 of the finger mechanism 4 located on the right side is located on the near side between a pair of side walls 8 and 9. Therefore, the base end side extending portion 32 of the finger mechanism 3 located on the left side extends in a substantially left direction on the far side between the side walls 8 and 9, and the base end side extending portion 32 of the finger mechanism 4 located on the right side extends in a substantially right direction on the near side between the side walls 8 and 9. As shown in FIGS. 2 and 4, the base end side extending portion 32 curves in a bow shape having substantially the same curvature as the outer surface of the base end portion of the driving link 21 such that the base end side extending portion 32 does not interfere with the outer surface of the base end portion of the driving link 21 when the driving link 21 rotates.

The tip end side extending portion 33 is formed to have a U-shaped cross section. The tip end side extending portion 33 includes: a flat plate-shaped base portion 34 connected to the base end side extending portion 32; and a pair of side wall portions 35 and 36, each provided to be bent perpendicularly from a side edge of the base portion 34. In the finger mechanism 3 located on the left side, an outer surface of the side wall portion 35 located on the far side and an outer surface of the base end side extending portion 26 form the same surface, and the side wall portion 35 and the base end side extending portion 32 extend integrally. The base portion 35 extends from the side wall portion 35 and the base end side extending portion 32 to the near side. This direction in which the base portion 35 extends is a width direction of the base portion 35. In the finger mechanism 4 located on the right side, a relation between the far side and the near side is opposite to the above relation, and the side wall portion 35 located on the near side and the base end side extending portion 32 extend integrally.

A center portion of the intermediate link 23 is coupled to the tip end portion of the driven link 22 so as to be swingable. More specifically, at the tip end portion of the driven link 22, the base portion 32 is cut out in a rectangular shape toward the base end side, and a pair of side wall portions 30 and 31 are opposed to each other in the rotation axis direction. A pair of side wall portions 35 and 36 of the intermediate link 23 are arranged between the side wall portions 30 and 31 of the driven link 22, the side wall portions 30 and 31 being formed by the above cut-out. Bearings 37 are respectively incorporated in the side wall portions 30 and 31 of the driven link 22 arranged on the outer side. A joint member 38 is sandwiched between the side wall portions 35 and 36 of the intermediate link 23 arranged on the inner side. A pin 39 projecting in parallel with the rotation axis direction is provided on both side surfaces of the joint member 38. The pin 39 penetrates the side wall portions 35 and 36 of the intermediate link 23 and is rotatably supported by the bearings 37.

As above, the joint member 38 is interposed between the tip end portion of the driven link 22 and the center portion of the intermediate link 23, and the tip end portion of the driven link 22 and the center portion of the intermediate link 23 are coupled to each other so as to be swingable each other and so as to be swingable with respect to the joint member 38. Moreover, the joint member 38 is supported by the side wall portions 30 and 31 of the driven link 22 and the side wall portions 35 and 36 of the intermediate link 23 from both sides thereof. Therefore, the strength for supporting the load acting in the rotation axis direction on a link, such as the tip end side extending portion 33 of the intermediate link 23, located on the tip end side of the joint member 38 increases, and the durability of the robot hand 1 improves.

The joint member 38 includes a bent portion 40 configured to be cranked with respect to a coupled portion where the driven link 22 and the intermediate link 23 are coupled to each other. The bent portion 40 of the finger mechanism 3 located on the left side is bend toward the far side of the coupled portion, and the bent portion 40 of the finger mechanism 4 located on the right side is bent toward the near side of the coupled portion.

A first parallel link 41 extending in parallel with the driven link 22 is provided between the bent portion 40 and the base 2. This "parallel" concept denotes that a straight line connecting a swing fulcrum of a base end portion of the first parallel link 41 and a swing fulcrum of a tip end portion of the first parallel link 41 is in parallel with a straight line connecting a swing fulcrum of the base end portion of the driven link 22 and a swing fulcrum of the tip end portion of the driven link 22, and the shape of the first parallel link 41 between the swing fulcrums thereof does not have to be the same as the shape of the driven link 22 between the swing fulcrums thereof.

A pin 42 projecting in parallel with the rotation axis direction is provided on both side surfaces of the base end portion of the first parallel link 41. The pin 42 is rotatably supported by bearings 43 incorporated in the side walls 8 and 9. The bearings 43 are respectively arranged between the bearing 16 supporting the rotating shaft 15 and the bearing 28 supporting the base end portion of the driven link 22 and between the bearing 17 supporting the rotating shaft 16 and the bearing 28 supporting the base end portion of the driven link 22. The first parallel link 41 includes two side wall portions 44 and 45 that are tip end portions thereof. The bent portion 40 of the joint member 38 is sandwiched between a pair of side wall portions 44 and 45. A pin 47 projecting in the axial direction of the rotating shaft 15 or 16 is provided on both side surface of the bent portion 40. The pin 47 is rotatably supported by bearings 48 incorporated in the side wall portions 44 and 45.

As above, the base end portion of the first parallel link 41 is coupled to the base 2 so as to be swingable, and the tip end portion of the first parallel link 41 is coupled to the joint member 38 so as to be swingable. The bent portion 40 of the joint member 38 is supported by the side wall portions 44 and 45 of the first parallel link 41 from both sides thereof. Therefore, the strength for supporting the load acting in the rotation axis direction on a link, such as the tip end side extending portion 33 of the intermediate link 23, located on the tip end side of the joint member 38 increases, and the durability of the robot hand 1 improves.

The driven link 22 and the first parallel link 41 constitute a parallel link mechanism. To be specific, when the driven link 22 swings, the first parallel link 41 also swings, and the joint member 38 moves along the movement trajectory of the tip end portion of the driven link 22, but the posture of the joint member 38 with respect to the base 2 does not change.

At this time, the first parallel link 41 is arranged on the driving link 21 side of the driven link 22. Therefore, in the case of providing the parallel link mechanism, the base 2 does not increase in size in the left-right direction, so that the entire hand can be reduced in size.

In plan view, the bent portion 40 sandwiched by the first parallel link 41 from both sides thereof is arranged so as to overlap the base end side extending portion 32 of the intermediate link 23. Moreover, the base end side extending portion 32 extends between the tip end portions of the driving link 21 and driven link 22 respectively located on the right and left sides of the first parallel link 41, so as to pass through a space between the side wall portions 44 and 45 of the first parallel link 41. With this configuration, in a case where the first parallel link 41 is arranged between the driven link 22 and the driving link 21 and is provided with the structure for supporting the bent portion 40 of the joint member 38 from both sides thereof, interference between the intermediate link 23 and the first parallel link 41 can be avoided.

The tip end side extending portion 33 of the intermediate link 23 extends toward the tip end side of the joint member 38. At the tip end portion of the intermediate link 23, the base portion 34 is cut out in a rectangular shape toward the base end side, and a pair of side wall portions 35 and 36 are opposed to each other in the rotation axis direction. A base portion of a holding member 49 is sandwiched between the side wall portions 35 and 36. A pin 50 projecting in the rotation axis direction is provided on both side surfaces of the base portion of the holding member 49. The pin 50 is rotatably supported by bearings 51 incorporated in the side wall portions 35 and 36 of the tip end side extending portion 33.

As above, the tip end portion of the intermediate link 23 (tip end side extending portion 33) is coupled to the holding member 49 so as to be swingable. Moreover, the base portion of the holding member 49 is supported by the side wall portions 35 and 36 of the intermediate link 23 from both sides thereof. Therefore, the strength for supporting the load acting in the rotation axis direction on the tip end portion of the holding member 49 increases, and the durability of the robot hand 1 improves.

A second parallel link 52 extending in parallel with the intermediate link 23 is provided between the holding member 49 and the joint member 38. This "parallel" concept denotes that a straight line connecting a swing fulcrum of a base end portion of the second parallel link 52 and a swing fulcrum of a tip end portion of the second parallel link 52 is in parallel with a straight line connecting a swing fulcrum of an intermediate portion of the intermediate link 23 and a swing fulcrum of the tip end portion of the intermediate link 23, and the shape of the second parallel link 52 between the swing fulcrums thereof does not have to be the same as the shape of the intermediate link 23 between the swing fulcrums thereof.

The second parallel link 52 is formed to have a U-shaped cross section. The second parallel link 52 includes a flat plate-shaped base portion 53 and a pair of side wall portions 54 and 55, each provided to be bent perpendicularly from an edge of the base portion 53. The width of the base portion 53 is substantially the same as the width of the tip end side extending portion 33. At the base end portion of the second parallel link 52, the base portion 53 is cut out in a rectangular shape toward the tip end side, and a pair of side wall portions 54 and 55 are opposed to each other. The joint member 38 is sandwiched between the side wall portions 54 and 55 of the base end portion. A pin 56 projecting in parallel with the axial direction of the rotating shaft 15 or 16 is provided on both side surfaces of the joint member 38. The pin 56 is rotatably supported by bearings 57 incorporated in the base end portions of the side wall portions 54 and 55. Moreover, at the tip end portion of the second parallel link 52, the base portion 53 is cut out in a rectangular shape toward the base end side, and a pair of side wall portions 54 and 55 are opposed to each other. The holding member 49 is sandwiched between the tip end portions of the side wall portions 54 and 55. A pin 58 projecting in parallel with the axial direction of the rotating shaft 15, 16 is provided on both side surfaces of the holding member 49. The pin 58 is rotatably supported by bearings 59 incorporated in the tip end portions of the side wall portions 54 and 55.

As above, the base end portion of the second parallel link 52 is coupled to the joint member 38 so as to be swingable, and the tip end portion of the second parallel link 52 is coupled to the holding member 49 so as to be swingable. Moreover, the joint member 38 is supported by the side wall portions 54 and 55 of the second parallel link 52 from both sides thereof. Therefore, the strength for supporting the load acting in the rotation axis direction on a link, such as the tip end side extending portion 33 of the intermediate link 23, located on the tip end side of the joint member 38 increases, and the durability of the robot hand 1 improves. Similarly, the holding member 49 is supported by the side wall portions 54 and 55 of the second parallel link 52 from both sides thereof. Therefore, the strength for supporting the load acting in the rotation axis direction on the tip end portion of the holding member 49 increases, and the durability of the robot hand 1 improves.

The tip end side extending portion 33 of the intermediate link 23 and the second parallel link 52 constitute the parallel link mechanism. To be specific, when the intermediate link 23 swings, the second parallel link 52 also swings, and the holding member 49 moves along the movement trajectory of the tip end portion of the intermediate link 23, but the posture of the holding member 49 with respect to the joint member 38 does not change, that is, the posture of the holding member 49 with respect to the base 2 does not change.

The second parallel link 52 is arranged on a side of the tip end side extending portion 33 of the intermediate link 23, the side being a side where the other finger mechanism is arranged. To be specific, for example, the second parallel link 52 located on the left side is arranged on the right side of the tip end side extending portion 33 of the intermediate link 23. Moreover, the swing fulcrum of the tip end portion of the second parallel link 52 is arrange on a side of the swing fulcrum of the tip end portion of the intermediate link 23, the side being away from the base 2. Therefore, the base portion of the holding member 49 extends so as to be away from the base 2 and get close to the other finger mechanism from a coupled portion where the holding member 49 and the intermediate link 23 are coupled to each other. With this configuration, as described below, a minimum value L4 of the mutual interval between the fingertip portions 19 and 20 can be reduced.

The tip end portion of the holding member 49 is connected to the base portion of the holding member 49 extending as above and is arranged so as to project from the tip end side extending portion 33 and the second parallel link 52. A flat holding surface 60 extending perpendicular to the base member 5 on an inner side in the left-right direction is formed at the tip end portion of the holding member 49. In the present embodiment, the tip end portions of the holding members 49 attached to the tip end portions of the intermediate links 23 form the fingertip portions 19 and 20 of the finger mechanism 3, and a left-right distance between the holding surfaces 60 opposed to each other in the left-right direction is the mutual interval between the fingertip portions 19 and 20.

As above, the driving link 21, the driven link 22, and the intermediate link 23 constitute the Chebychev link mechanism. To be specific, when a straight-line distance between the rotational center of the driving link 21 and the swing fulcrum of the tip end portion of the driving link 21 is 1, a straight-line distance between the rotational center of the driving link 21 and the swing fulcrum of the base end portion of the driven link 22 is 2, a straight-line distance between the swing fulcrum of the base end portion of the driven link 22 and the swing fulcrum of the tip end portion of the driven link 22 is 2.5, and a straight-line distance between the swing fulcrum of the base end portion of the intermediate link 23 and the swing fulcrum of the tip end portion of the intermediate link 23 is 5. Moreover, the swing fulcrum of the driven link 22 with respect to the intermediate link 23 is located on a line connecting the swing fulcrum of the base end portion of the intermediate link 23 and the swing fulcrum of the tip end portion of the intermediate link 23 and is a middle point of this line. As above, each of the finger mechanisms 3 and 4 of the present embodiment is configured based on the Chebychev link mechanism and is configured such that two parallel link mechanisms are further combined.

Hereinafter, operations of the robot hand 1 will be explained based on FIGS. 5A to 5C.

Figure 5A:
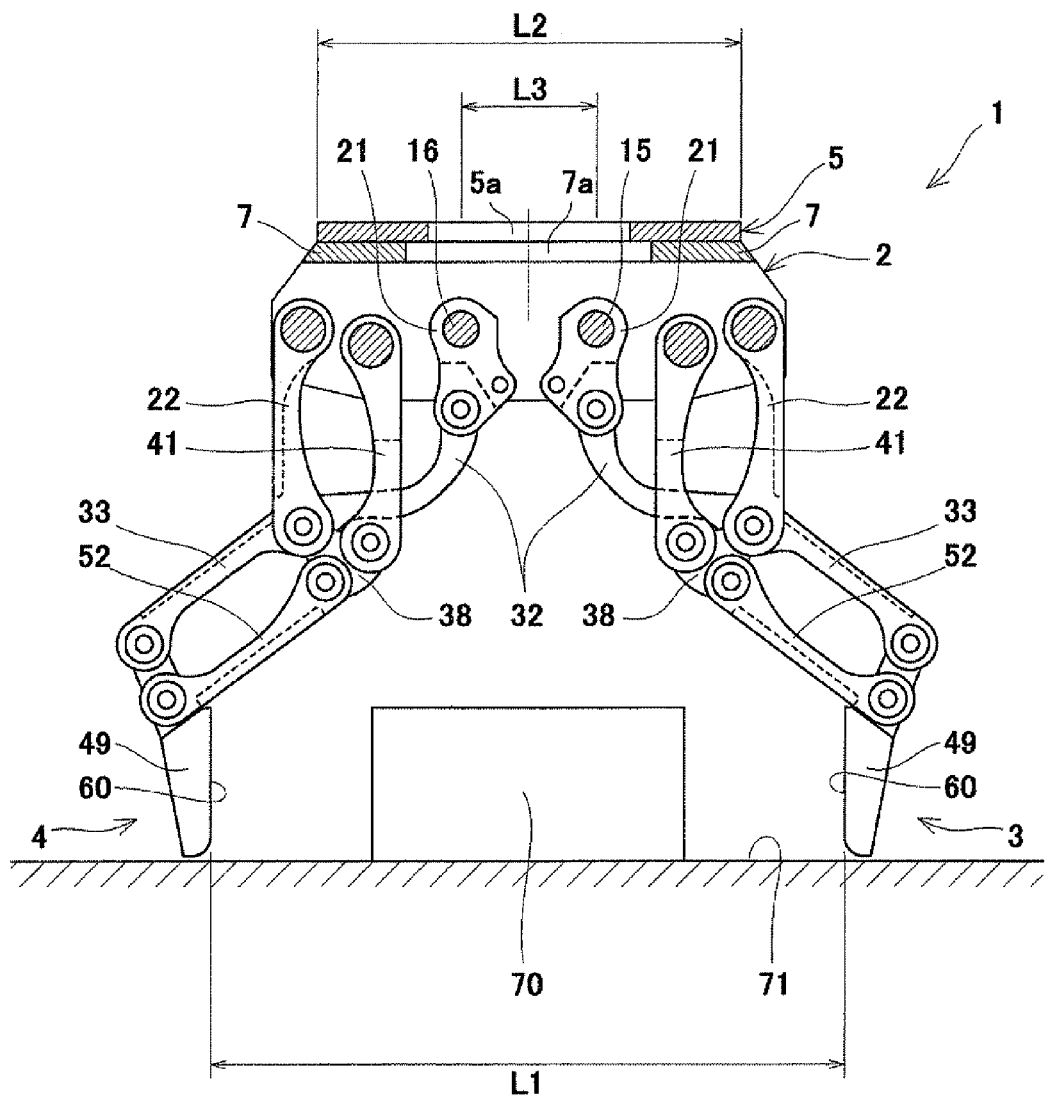
FIG. 5A is a diagram for explaining an operation of the robot hand according to Embodiment 1 of the present invention and is a diagram showing a state where a mutual interval between fingertip portions is maximum in a step of preparing holding of a work.

As shown in FIG. 5A, a work 70 is supported by an upper surface of a predetermined support base 71. When holding the work 70, first, a robot arm, not shown, is driven to cause the robot hand 1 to move close to the upper surface of the support base 71, and the fingertip portions 19 and 20 are opposed to the upper surface of the support base 71 with a clearance while preventing the fingertip portions 19 and 20 from hitting the support base 71. At this time, the driving links 21 of the finger mechanisms 3 and 4 are in the standing state in advance such that the mutual interval between the fingertip portions 19 and 20 becomes a maximum value L1.

The standing state denotes a state where the rib portion 24 of the driving link 21 stands on a side of the rotating shaft 15, 16, the side being opposite to a side where the base member 5 is arranged in this standing state, the tip end portions of the driven link 22 and first parallel link 41 also stand in the same manner, and the tip end portion of the intermediate link 23 is located at a position farthest from the driving link 21 in the left-right direction. At this time, the left-right distance between the center of the pin 25 (that is, the rotational center of the driving link 21) and the swing fulcrum of the tip end portion of the intermediate link 23 is twice the left-right distance between the center of the pin 25 (that is, the rotational center of the driving link 21) and the swing fulcrum of the base end portion of the driven link 22.

Here, as a left-right size L2 of the base 2, not only a size between the rotational center of the driving link 21 and the swing fulcrum of the base end portion of the driven link 22 but also a size L3 between the rotational centers of the driving links 21 located on the left and right sides and a size necessary for incorporating the bearings 28 (see FIGS. 2 to 4) supporting the base end portions of the driven links 23 are secured. Therefore, it is unavoidable that the left-right size L2 of the base 2 becomes larger than a length that is simply twice the size between the rotational center of the driving link 21 and the swing fulcrum of the base end portion of the driven link 22. Moreover, the holding member 49 itself is thick, and the holding members 49 of the present embodiment extend from the swing fulcrums of the tip end portions of the intermediate links 23 so as to get close to each other. Therefore, the left-right distance between the rotational center of the driving link 21 and the holding surface 60 is shorter than the left-right distance between the rotational center of the driving link 21 and the swing fulcrum of the tip end portion of the intermediate link.

Even in consideration of these circumstances, in the finger mechanisms 3 and 4 configured by the Chebychev link mechanism, when the driving links 21 are in the standing state, the holding surfaces 60 can be respectively located on outer sides of both left and right end portions of the base 2 in the left-right direction. Therefore, the maximum value L1 of the mutual interval between the fingertip portions 19 and 20 becomes larger than the left-right size L2 of the base 2. Thus, the entire hand 1 can be reduced in size. In FIG. 5A, the maximum value L1 of the mutual interval between the fingertip portions 19 and 20 is about L3 times the left-right size L2 of the base 2.

From such state, the motors 11 and 12 (see FIGS. 2 and 3) are driven to rotate the driving links 21 together with the rotating shafts 15 and 16. At this time, the driving links 21 in the standing state rotate such that the tip end portions thereof get close to each other. To be specific, the standing driving links 21 rotate so as to be away from the corresponding fingertip portions 19 and 20.

Figure 5B:
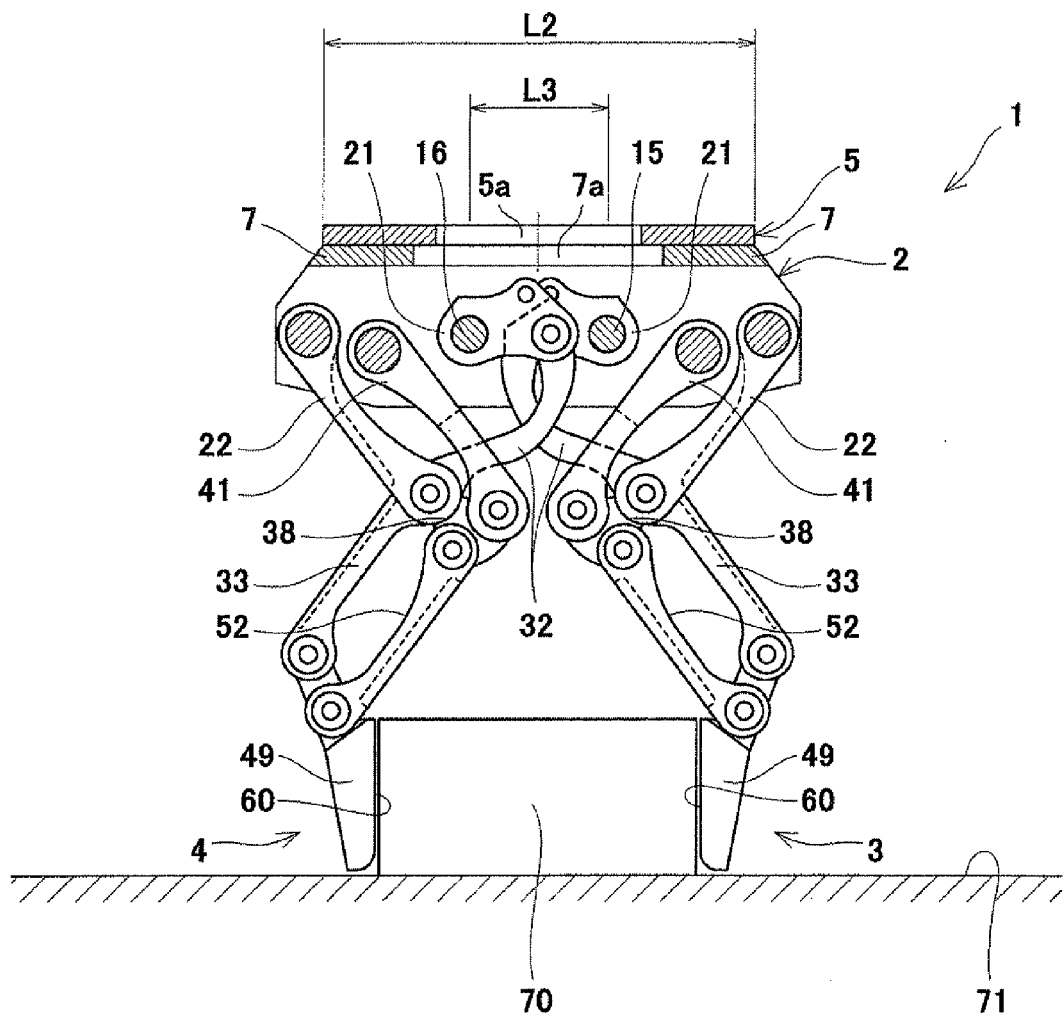
FIG. 5B is a diagram for explaining the operation of the robot hand according to Embodiment 1 of the present invention and is a diagram showing a state where the mutual interval between the fingertip portions is reduced to hold the work.

When the driving links 21 rotate in this direction, as shown in FIG. 5B, the tip end portion of the intermediate link 23 that is a component of the Chebychev link mechanism linearly moves, without changing its height from the base 2, along a straight portion 811 of the circumferential movement trajectory 810 shown in FIG. 1 toward a side where the driving link 21 is provided. The holding member 49 coupled to the tip end portion of the intermediate link 23 linearly moves along the movement trajectory of the tip end portion of the intermediate link 23 while maintaining the posture of the holding surface 60 extending perpendicular to the base member 5. To be specific, the fingertip portions 19 and 20 of the present embodiment change the mutual interval while unchanging the heights thereof from the base 2 and the postures thereof. Therefore, when holding the work 70, a possibility that the fingertip portions 19 and 20 hit the support base 71 and a possibility that the failure of the holding of the work occurs can be reduced.

When the driving links 21 located on the left and right sides rotate such that the tip end portions thereof get close to each other, the driving links 21 overlap each other in front view in a predetermined rotation angular range. To be specific, the size L3 between the rotational centers of the driving links 21 located on the left and right sides is shorter than a distance that is twice the straight-line distance between the rotational center of the driving link 21 and the swing fulcrum of the tip end portion of the driving link 21. As shown in FIG. 3 and as described above, since the driving links 21 are arranged between the side walls 8 and 9 so as to be displaced in the rotation axis direction, the driving links 21 located on the left and right sides do not interfere with each other. As above, since the driving links 21 located on the left and right sides are arranged so as to overlap each other in the predetermined angular range, two finger mechanisms 3 and 4 are collectively arranged in the left-right direction, so that the entire hand 1 can be reduced in size.

Since the finger mechanisms 3 and 4 are arranged so as to be displaced in the rotation axis direction, the interval between the side walls 8 and 9 can be increased. By utilizing the increased space, the structures for supporting the base end portion of the intermediate link 23 and the joint member 38 from both sides can be arranged reasonably. Moreover, as shown in FIG. 3, the displacement of the driving links 21 in the rotation axis direction is canceled by the width of the base portion 34 of the intermediate link 23 and the width of the base portion 29 of the driven link 22. Therefore, the holding surfaces 60 of the holding members 49 are opposed to each other in the left-right direction without being displaced in the axial direction. Moreover, since the driven link 22 and the intermediate link 23 can respectively include the wide base portions 29 and 34, the stiffness thereof can be secured.

Then, the holding surfaces 60 respectively contact the side surfaces of the work 70, and the motors 11 and 12 (see FIGS. 2 and 3) stop with a predetermined pressing force acting on the work 70 from the holding surfaces 60. With this, the robot hand 1 holds the work 70 and can convey the work 70 from the support base 71 to the other place by driving the robot arm, not shown. Since the holding surfaces 60 are opposed to each other without being displaced in the axial direction, certainty of the holding of the work 70 is high.

Figure 5C:
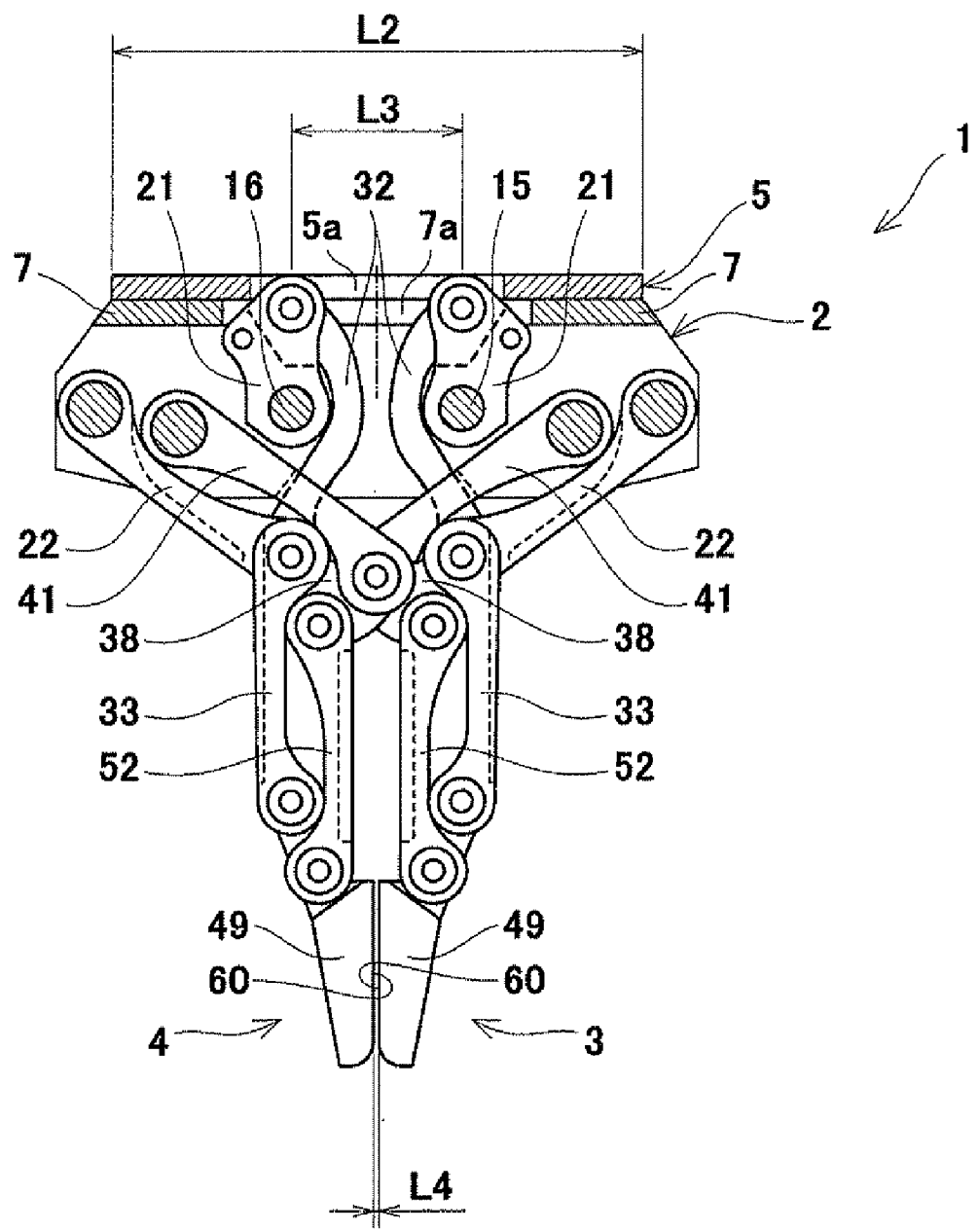
FIG. 5C is a diagram for explaining the operation of the robot hand according to Embodiment 1 of the present invention and is a diagram showing a state where the mutual interval between the fingertip portions is minimum.

FIG. 5C shows a state where the mutual interval between the fingertip portions 19 and 20 is minimum. At this time, the tip end portion of the driving link 21 has rotated 180 degrees from the standing state shown in FIG. 5A and hanged from the rotating shaft 15, 16 toward the base member 5.

Here, an opening 7a is formed on the bottom wall 7, and an opening 5a communicated with the opening 7a is formed on the base member 5. Therefore, even when the driving links 21 are in the hanged state, the tip end portions of the driving links 21 are located in the openings 5a and 7a, so that the interference between the driving link 21 and the bottom wall 7 can be avoided. As above, since the finger mechanisms 3 and 4 can be assembled to the base 2 without considering the interference between the finger mechanism 3, 4 and the base 2, processing of holes for accommodating the bearings supporting the rotating shafts 15 and 16 and the assembling of the robot hand 1 can be prevented from becoming complex.

In this hanged state, the rotational center of the driving link 21 is located on a line connecting the swing fulcrum of the tip end portion of the intermediate link 23 and the swing fulcrum of the base end portion of the intermediate link 23, and the left-right distance between the tip end portion of the intermediate link 23 and the rotational center of the driving link 21 becomes zero.

As described above, the base portions of the holding members 49 are inclined and extend so as to get close to each other. Therefore, even if the rotational centers of the driving links 21 located on the left and right sides are spaced apart from each other in the left-right direction, the interval between the holding surfaces 49 of the holding members 42 that are the fingertip portions 19 and 20 can be set to be smaller than the distance L3 between the rotational centers. Therefore, the minimum value L4 of the mutual interval between the fingertip portions 19 and 20 becomes smaller than the distance L3 between the rotational centers of the driving links 21, so that the fingertip portions 19 and 20 can hold a work having a small width.

Moreover, the minimum value L4 of the mutual interval between the fingertip portions 19 and 20 can be reduced by increasing the thickness of the tip end portion of the holding member 49. In the present embodiment, the thickness of the holding member 49 is set such that the minimum value L4 of the mutual interval becomes substantially zero. Here, "substantially zero" denotes, for example, about 1 mm. Meanwhile, the driving links 21 located on the left and right sides are arranged so as to overlap each other in the predetermined angular range in front view, so that the distance L3 between the rotational centers of the driving links 21 becomes as short as possible. Therefore, in order to reduce the minimum value L4 of the mutual interval between the fingertip portions 19 and 20, it is unnecessary to excessively increase the thickness of the holding member 49, and this contributes to the reduction in weight and cost of the robot hand 1.

Embodiment 2

Next, the robot hand according to Embodiment 2 of the present invention will be explained based on FIGS. 6A and 6B. The same reference signs are used for the same components as in Embodiment 1, and detailed explanations thereof are omitted.

Figure 6A:
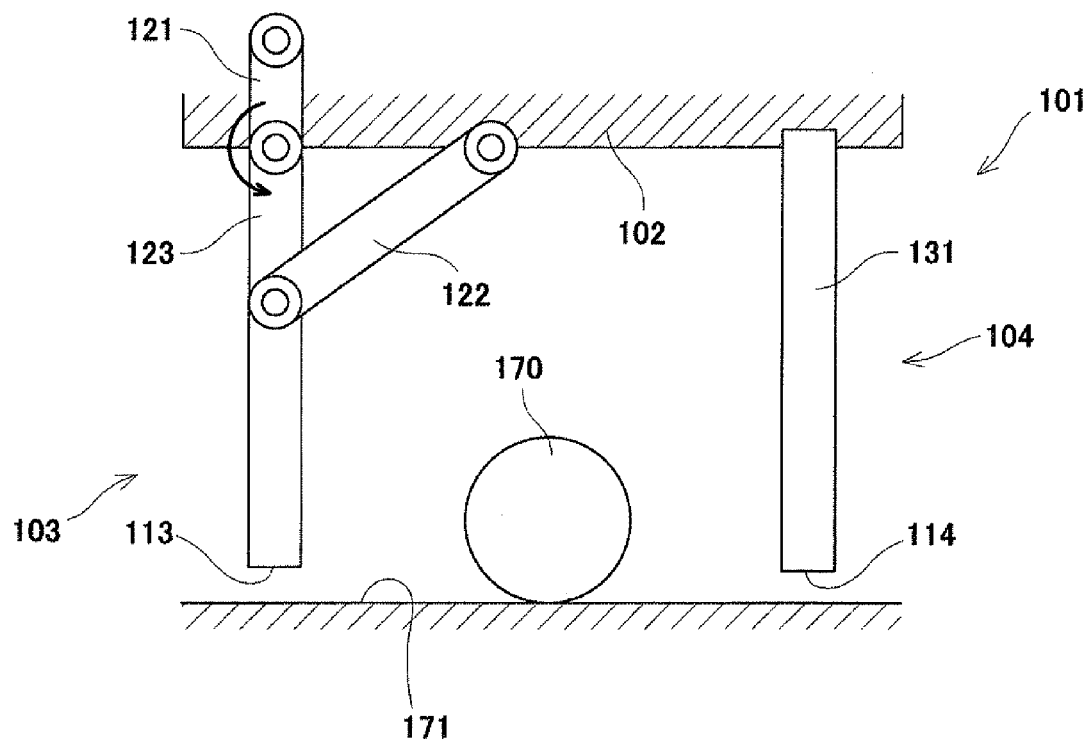
FIG. 6A is a diagram for explaining the operation of the robot hand according to Embodiment 2 of the present invention and is a diagram showing a state where the mutual interval between the fingertip portions is maximum in the step of preparing the holding of the work.

As shown in FIG. 6A, two finger mechanisms 103 and 104 are provided on a base 102 of a robot hand 101. The finger mechanism 103 is constituted by the Chebychev link mechanism including a fixed link 121, a driven link 122, and an intermediate link 123, and the base 2 serves as a fixed link that is one of components of the Chebychev link mechanism. Since coupling structures of respective links and length ratios of respective links are the same as those shown in FIG. 1, detailed explanations thereof are omitted. An output shaft of a motor, not shown, attached to the base 102 is coupled to a base end portion of the driving link 121, and a rotary driving force output from the motor is input to the base end portion of the driving link 121. The finger mechanism 104 is constituted by a fixed link 131 having a base end portion fixed to the base 2. Since the fixed link 131 does not move with respect to the base 2, a driving source for driving the fixed link 131 is not provided in the robot hand 101.

A fingertip portion 113 of the finger mechanism 103 is formed by the tip end portion of the intermediate link 123, and a fingertip portion 114 of the finger mechanism 104 is formed by the tip end portion of the fixed link 131.

FIG. 6A shows a log-like work 170 supported by an upper surface of a support base 171. When holding the work 170, the fingertip portions 113 and 114 of the robot hand 101 are caused to get close to the upper surface of the support base 171. At this time, the driving link 121 of the finger mechanism 103 extends toward the base 2, that is, the driving link 121 of the finger mechanism 103 is in the hanged state. In this hanged state, the left-right distance between the tip end portion of the intermediate link 123 and the rotational center of the driving link 121 becomes zero, and the mutual interval between the fingertip portions 113 and 114 becomes maximum.

Next, the motor, not shown, is driven to cause the driving link 121 to rotate toward a side away from the finger mechanism 104. When the driving link 121 rotates in this direction, the tip end portion of the intermediate link 123 that is a component of the Chebychev link mechanism linearly moves, without changing the height from the base 102, along the straight portion 811 of the circumferential movement trajectory shown in FIG. 1 toward a side away from the rotational center of the driving link 121. With this, the mutual interval between the fingertip portions 113 and 114 shortens. At this time, the posture of the intermediate link 123 with respect to the base 2 changes in accordance with the change in the rotation angle of the driving link 121, that is, the mutual interval between the fingertip portions 113 and 114.

Figure 6B:
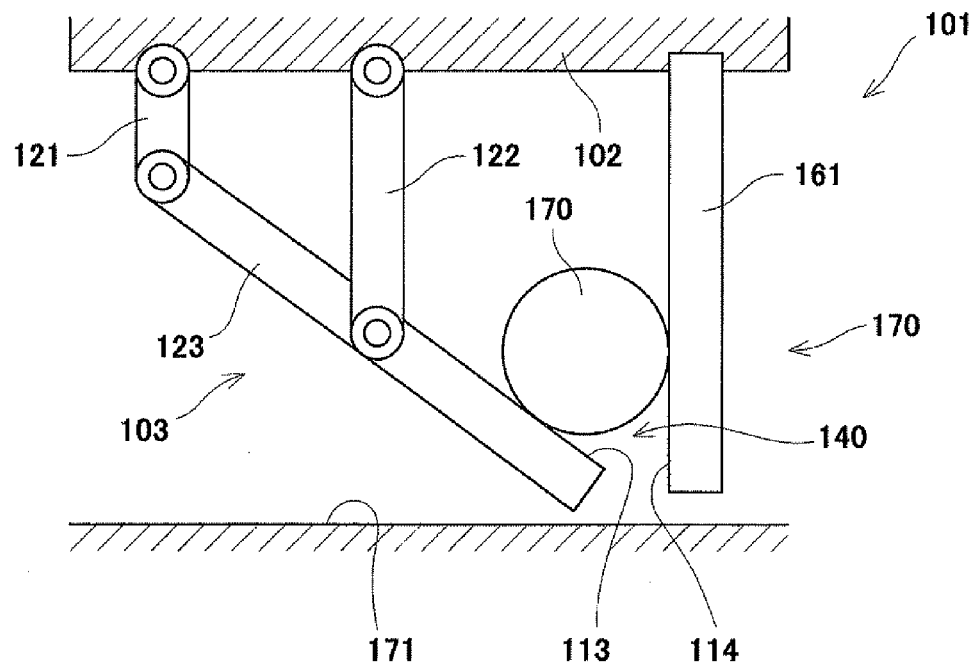
FIG. 6B is a diagram for explaining the operation of the robot hand according to Embodiment 2 of the present invention and is a diagram showing a state where the work is held by both fingertip portions and the mutual interval between the fingertip portions is minimum.

FIG. 6B shows a state where the mutual interval between the fingertip portions 113 and 114 is minimum. At this time, the driving link 121 has rotated 180 degrees from the hanged state shown in FIG. 6A and stands in a direction away from the base 102.

As above, while the driving link 121 rotates, the mutual interval between the fingertip portions 113 and 114 narrows. In this process, the posture of the fingertip portion 113 changes, a direction in which the intermediate link 123 extends inclines with respect to a direction in which the fixed link 131 extends, and a holding space 140 which tapers toward the tip end side is formed on an inner side of the fixed link 131 and intermediate link 123. The work 170 having a circular outer shape is supported at a tip end side of the tapered holding space 140 and is restricted from rolling. As above, the robot hand 101 of the present configuration example can easily hold the work 170 having a circular cross section. In addition, the height of the fingertip portion 113 with respect to the base 102 does not change, so that a possibility that the fingertip portions 113 and 114 hit the support base 171 when holding the work 170 and a possibility that the failure of the holding of the work 170 occurs can be reduced.

As above, in the present embodiment, unlike Embodiment 1, the mutual interval between the fingertip portions 113 and 114 becomes maximum when the left-right distance between the tip end portion of the intermediate link 123 forming the fingertip portion 113 and the rotational center of the driving link 121 becomes zero, and the mutual interval between the fingertip portions 113 and 114 becomes minimum when the tip end portion of the intermediate link 123 is located farthest from the rotational center of the driving link 121. Even in this configuration, the movement trajectory of the fingertip portion 113 is set to correspond to the straight portion of the circumferential movement trajectory along which the tip end portion of the intermediate link that is a component of the Chebychev link mechanism may move. Therefore, the mutual interval between the fingertip portions 113 and 114 can be changed without changing the height of the fingertip portion 113 with respect to the base 2. Therefore, the fingertip portions 113 and 114 can easily hold the work having a small size.

As above, the robot hand according to the present invention does not have to include the parallel link mechanism, and at least one of a plurality of finger mechanisms may be constituted by the Chebychev link mechanism.

Examples of Application of Present Invention

Next, specific modes when the robot hand 1 of Embodiment 1 is put into practical use will be explained based on FIGS. 7 and 8.

Figure 7:
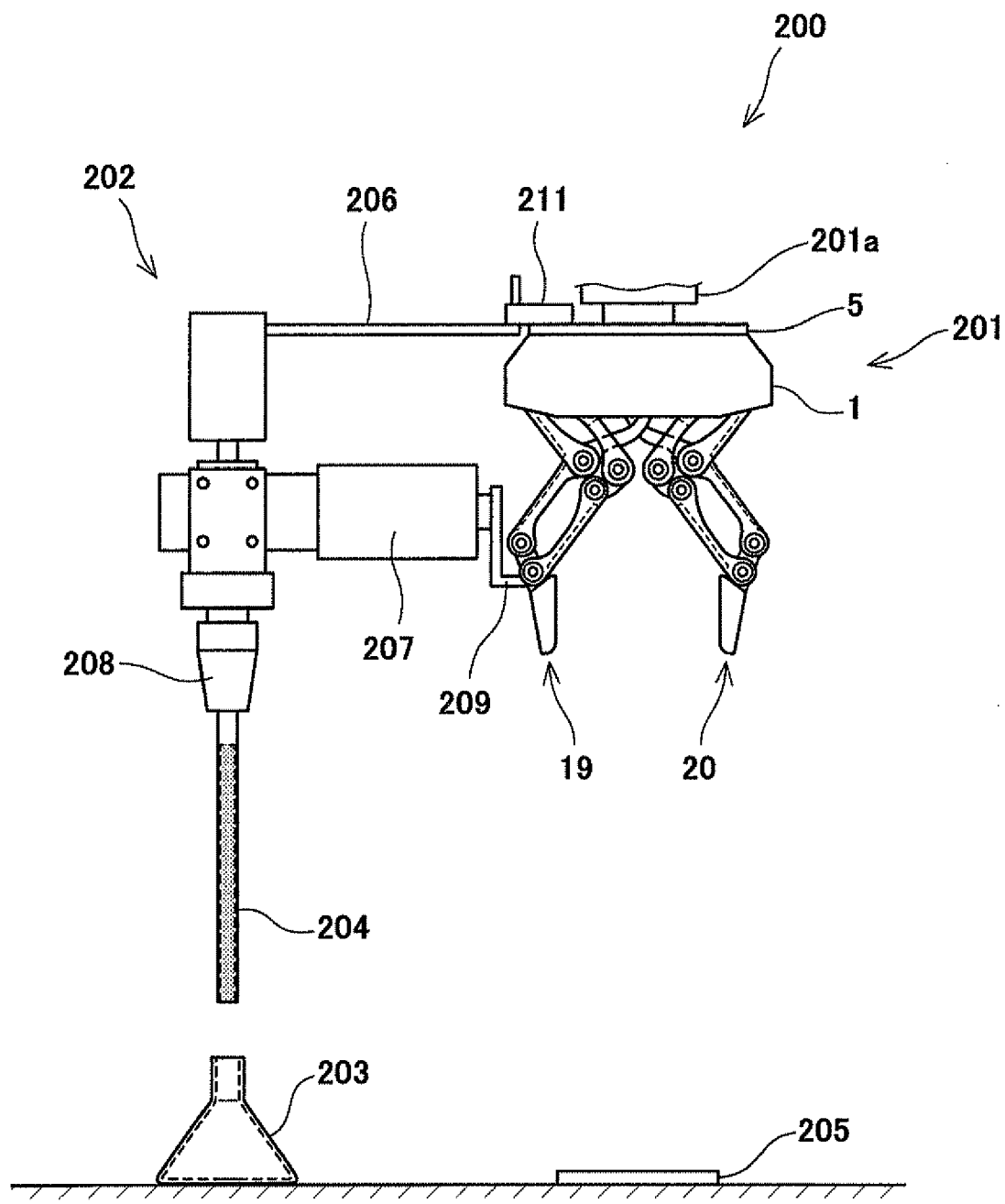
FIG. 7 is a schematic diagram of an automatic cell culture device to which the robot hand according to Embodiment 1 of the present invention is applied.

An automatic cell culture device 200 shown in FIG. 7 is a device configured to execute an operation of culturing cells under clean and aseptic circumstances in experiments in a pharmaceutical field or biological field. In order to execute this culturing operation, a robot system 201 and a pipetter 202 are included in an aseptic chamber. In addition, various instruments, such as a centrifuge tube, a flask 203, a pipette 204, and a petri dish 205, necessary for the culturing operation are arranged in the aseptic chamber.

The robot system 201 is configured such that the robot hand 1 according to Embodiment 1 of the present invention is attached to a tip end portion of a robot arm 201a. The robot system 201 handles the above various instruments and operates the pipetter 202. The robot hand 1 can hold the instruments, such as the flask 203 and the petri dish 205, and the held instrument can be moved in the chamber by the operation of the robot arm 201a.

The pipetter 202 is one example of a dedicated instrument for carrying out a pipette operation. The pipetter 202 includes: a robot connecting portion 206 detachably held by the robot hand 1; a piston portion 207 fixed to the robot connecting portion 206; and a pipette inserting portion 208 connected to the piston portion 207. The pipette 204 is attached to the pipette inserting portion 208 so as to extend vertically.

When the pipetter 202 does not carry out the pipette operation, it is held by a pipetter holding instrument (not shown) provided in the aseptic chamber. Moreover, an adapter 211 to which the robot connecting portion 206 is detachably attached is provided at the robot hand 1. The robot system 201 can operate to cause the adapter 211 to get close to the robot connecting portion 206 of the pipetter 202 held by the pipetter holding instrument and attach the robot connecting portion 206 to the adapter 211. As above, when the robot arm 201a of the robot system 201 is operated with the pipetter 202 attached to the adapter 211, the pipetter 202 can be moved together with the robot hand 1. Moreover, by the operation of the robot arm 201a, the pipette 204 attached to the pipette inserting portion 208 can be moved in the chamber. Then, the robot system 201 causes the pipetter holding instrument to hold the pipetter 202 attached to the adapter 211, and causes the robot arm 201a to move such that the adapter 211 moves away from the robot connecting portion 206. Thus, the pipetter 202 can be detached from the robot hand 1 of the robot system 201.

In the automatic cell culture device 200, the robot hand 1 operates a piston portion 207. An operation piece 209 is attached to the fingertip portion 19 of the robot hand 1. The operation piece 209 is arranged on an outer side of the fingertip portion 19. Specifically, the operation piece 209 is arranged on a side where the pipetter 202 fixed to the base member 5 is arranged.

When the fingertip portions 19 and 20 are operated to increase the mutual interval therebetween, the piston portion 207 is pressed by the operation piece 209 to linearly move. In the robot hand 1, the heights of the fingertip portions 19 and 20 do not change regardless of the mutual interval between the fingertip portions 19 and 20. Therefore, during the operation of the piston portion 207, the piston portion 207 and the robot hand 1 are not relatively displaced in a normal direction of an operation direction of the piston portion 207. With this, malfunction due to the displacement of the relative positions of the piston portion 207 and robot hand 1 during the operation of the piston portion 207 can be avoided. Moreover, since the displacement of the relative positions of the robot hand 1 and piston portion 207 does not occur, sliding between the robot hand 1 and the piston portion 207 does not occur when the robot hand 1 moves. Therefore, dust generation from the piston portion 207 and the robot hand 1 can be avoided.

As above, in the present embodiment, in light of the fact that the fingertip portion of the robot hand 1 linearly moves without changing the posture of the fingertip portion, the manipulation of the instrument attached to the robot hand 1 is carried out by utilizing the linear movement of the fingertip portion. As long as the instrument can be manipulated by such linear thrust force, not only the pipetter 202 but also the other instrument can be attached to the robot hand 1 and manipulated by the robot hand 1. In order that a plurality of instruments can be manipulated by one robot hand 1, each of these instruments may be provided with a robot connecting portion which is detachably attached to the adapter 211 of the robot hand 1 and has the same configuration as above.

Since various instruments are densely arranged in the automatic cell culture device 200, the robot system 201 having a small size is especially advantageous in terms of the degree of freedom of the arrangement. Since the robot hand 1 can be reduced in size as described above, the robot hand 1 can be preferably applied to the automatic cell culture device 200.

Moreover, since the robot system 201 operates under clean and aseptic circumstances, the robot system 201 needs to have cleanliness responsiveness and sterilization responsiveness. In order to give the cleanliness responsiveness to the robot system 201, the dust generation needs to be suppressed. The dust generation may occur at slide portions, such as joint portions. Moreover, gas sterilization may be applied as one example of a method for giving the sterilization responsiveness. The gas sterilization is a method for placing a sterilization target under an atmosphere of a gas having a sterilization property to sterilizing surfaces of the sterilization target. The gas, such as hydrogen peroxide steam, used in the gas sterilization may have a corrosive property.

Figure 9A:
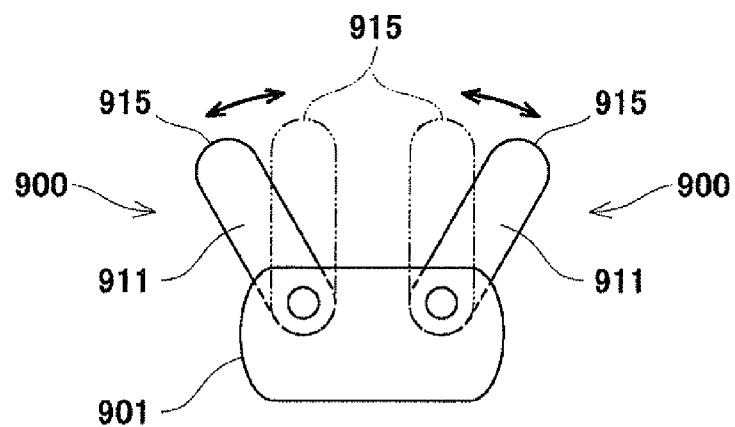
FIG. 9A is a diagram for explaining a conventional robot hand including a toggle-type finger mechanism.
Figure 9B:
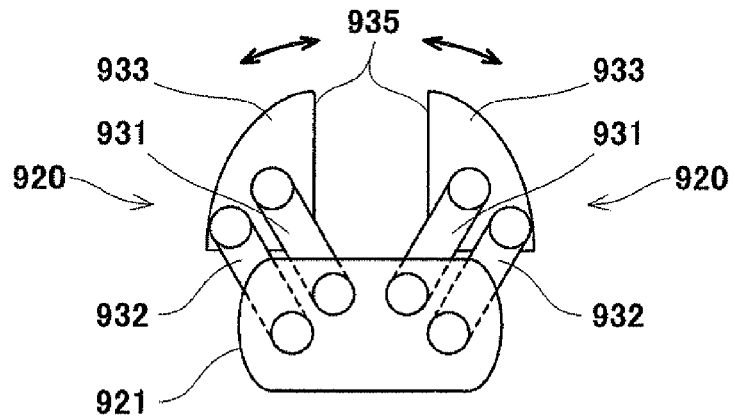
FIG. 9B is a diagram for explaining a conventional robot hand including a parallel link type finger mechanism.
Figure 9C:
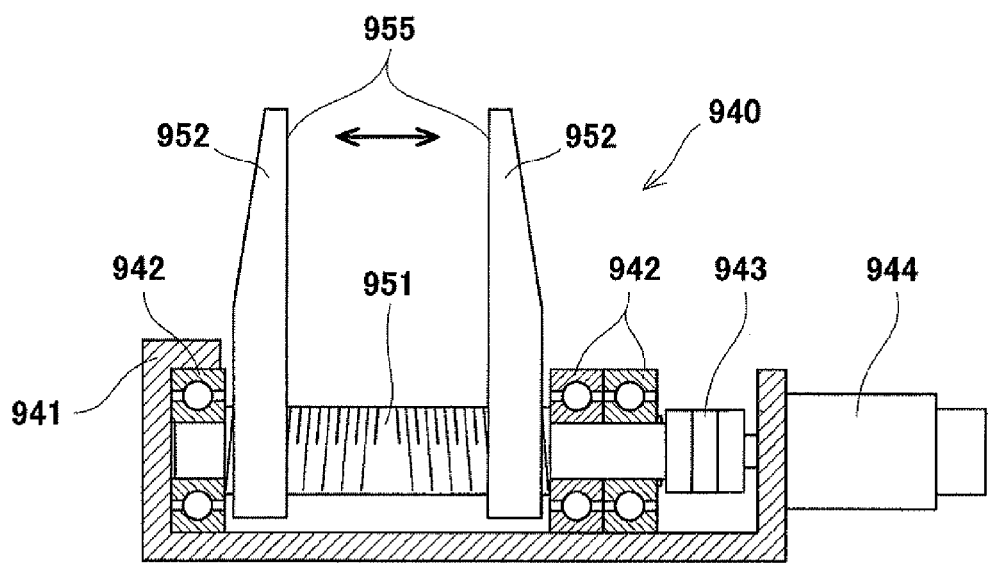
FIG. 9C is a diagram for explaining a conventional robot hand including a linear type finger mechanism.
Figure 10:
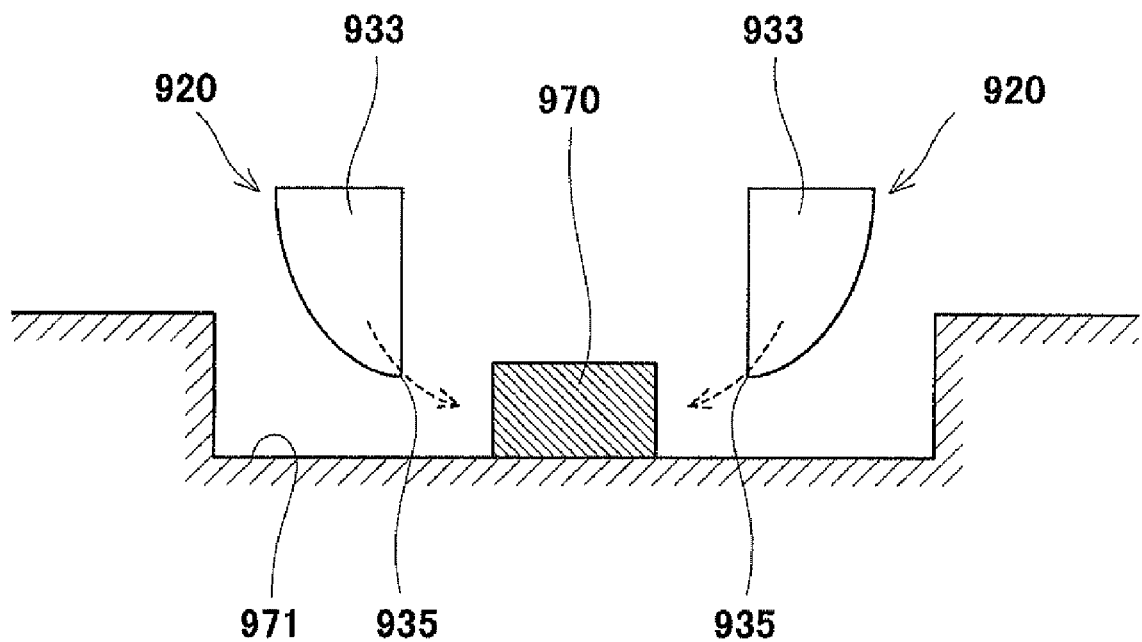
FIG. 10 is a diagram for explaining the operation of the conventional robot hand including the parallel link type finger mechanism shown in FIG. 9B.
Figure 11A:
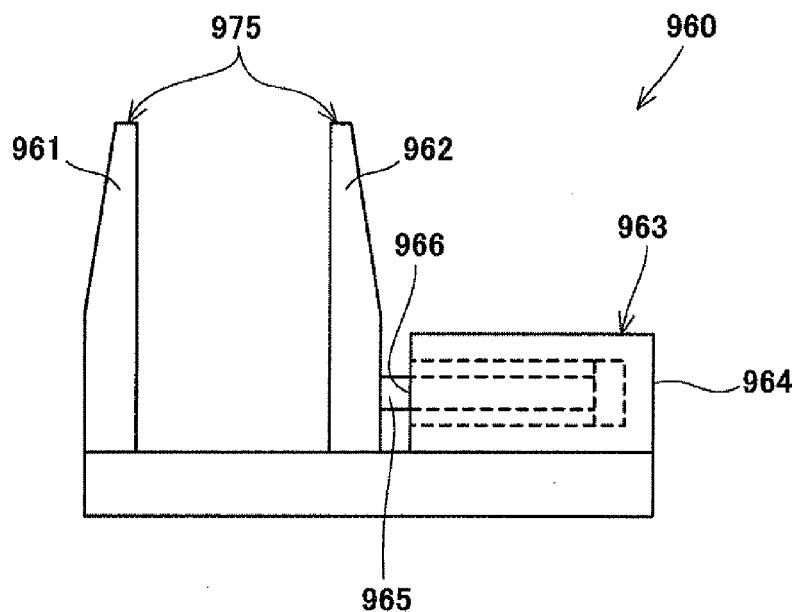
FIG. 11A is a diagram for explaining the conventional robot hand including the linear type finger mechanism and is a diagram showing a state where a linearly moving shaft thereof is accommodated.
Figure 11B:
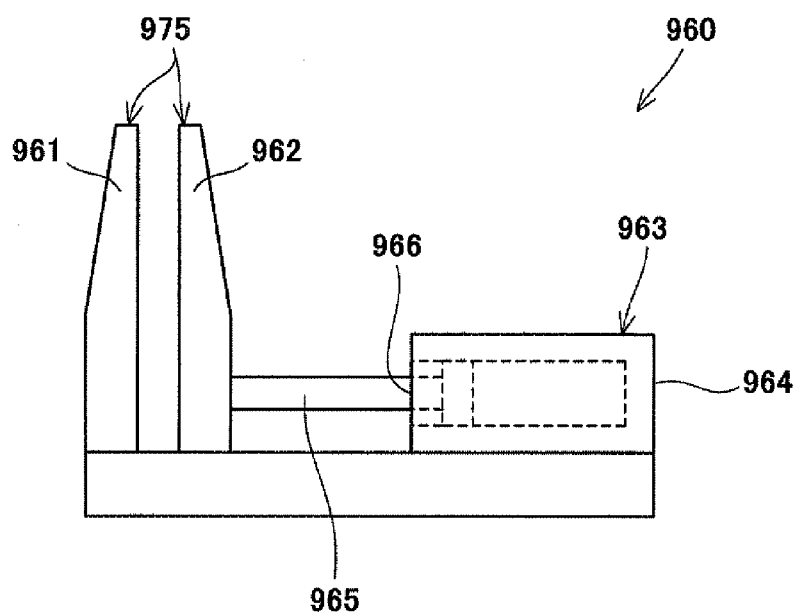
FIG. 11B is a diagram for explaining the conventional robot hand including the linear type finger mechanism and is a diagram showing a state where the linearly moving shaft is exposed.

Here, the conventional linear type robot hand shown in each of FIGS. 9C, 11A, and 11B has not only the problem regarding the increase in size as described above but also a problem regarding difficulties of the sterilization and the suppressing of the dust generation at a portion exposed to a working environment and an entire portion contacting the exposed portion.

To be specific, referring to FIG. 9C, a sterilization gas does not reach a portion where the ball screw 951 and the linearly moving link 952 contacts, so that the potion is not sterilized. In this case, when the linearly moving link 952 moves, the portion which is not sterilized is exposed to a working space, so that the working space is contaminated. The entire ball screw 951 may be sterilized by carrying out the sterilization while moving the linearly moving link 952. However, a portion of the linearly moving link 952 which portion contacts the ball screw 951 always contacts the ball screw 951, the sterilization gas cannot reach this portion of the linearly moving link 952. Moreover, the dusts may be generated by sliding between the ball screw 951 and the linearly moving link 952, and the dusts may be dispersed in the working environment by, for example, the operation of the robot hand 940.

Each of FIGS. 11A and 11B shows a linear type robot hand 960 configured such that fingertip portions 975 separate from each other or get close to each other by causing one of two links 961 and 962 that are the fingertip portions 975 to linearly move by an actuator 963, such as an air cylinder. To be specific, the actuator 963 includes a housing 964 and a linearly moving shaft 965 configured to move in its axial direction forward and backward with respect to the housing 964. The linearly moving link 962 is attached to a tip end portion of the linearly moving shaft 965. In this case, normally, in order to maintain airtightness of an internal space of the housing 964 of the actuator 963, an opening 966 for the linearly moving shaft 965 is sealed. Therefore, the sterilization gas does not reach the internal space of the housing 964, so that the internal space is not sterilized.

Then, as shown in FIG. 11A, in a state where the linearly moving shaft 965 is accommodated in the housing 964 before the operation of holding the work, the linearly moving shaft 965 may be contaminated by bacteria remaining in the internal space of the housing 964. After that, as shown in FIG. 11B, when the linearly moving shaft 965 is moved to the outside of the housing 964 for the operation of holding the work, the bacteria remaining in the internal space of the housing 964 may be dispersed from a portion of the linearly moving shaft 965 which portion is exposed to the working environment. In order to avoid this, the sterilization responsiveness may be given to the internal space in advance. However, in this case, the actuator 963 needs to be configured to have a special spec, and this may increase the cost. Moreover, in the case of using a contact seal as a seal of the opening 966, the dust generation may occur by the sliding between the linearly moving shaft 965 and the contact seal. Then, the dusts may move together with the linearly moving shaft 965 to be dispersed in the working environment.

As above, the conventional linear type robot hand includes a portion which is exposed and not exposed to the working environment, and this causes a technical problem, such as difficulties in the suppressing of the dust generation and the sterilization. However, since the robot hand 1 according to the present invention drives by the rotational joints, such problems can be solved.

Figure 8:
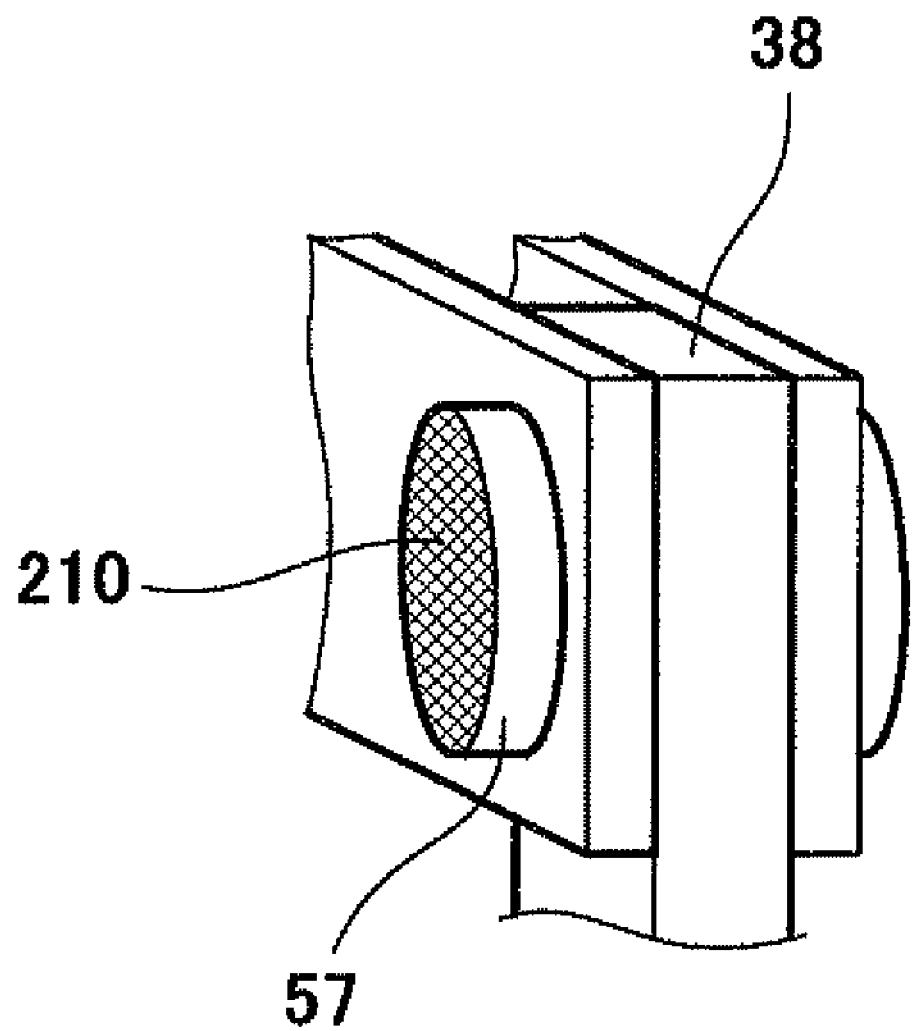
FIG. 8 is a perspective view showing the vicinity of a slide portion of the robot hand applied to the automatic cell culture device shown in FIG. 7.

FIG. 8 shows a specific configuration useful for solving the above problems. As shown in FIG. 8, in the robot hand 1 according to the present invention, the joint member 38 is assumed as the slide portion which may cause the dust generation. By using a seal structure for the joint member 38, the joint member 38 can be divided into a portion which should be sterilized and a portion which should not be sterilized. Thus, a portion exposed to the working environment during the operation of the robot system 201 and an entire portion contacting the exposed portion can be sterilized by the gas sterilization. As a specific mode of the seal structure, any component or structure, such as a packing, an O ring, or a labyrinth, can be adopted in addition to a cover seal 210 shown by cross hatching in FIG. 8. Further, by using a low dust generation type bearing as the bearing 57, the dust generation can be suppressed more effectively. Moreover, by providing a cover for the motors 11 and 12 (see FIG. 2), the dusts from the motors may be prevented from being dispersed to the periphery, and it becomes unnecessary to manufacture the motor using a material having high corrosive property as a special spec.

As above, the robot hand according to the present invention is especially preferably utilized in the pharmaceutical field and biological field. In addition, the robot hand according to the present invention is preferably utilized as a robot hand operated under clean and aseptic circumstances as in the food field and electron parts field. Of course, the robot hand according to the present invention is not limited to the applications under such circumstances.

From the foregoing explanation, many modifications and other embodiments of the present invention are obvious to one skilled in the art. Therefore, the foregoing explanation should be interpreted only as an example and is provided for the purpose of teaching the best mode for carrying out the present invention to one skilled in the art. The structures and/or functional details may be substantially modified within the spirit of the present invention.

INDUSTRIAL APPLICABILITY

The present invention is widely applicable to robot hands including a plurality of finger mechanisms.

REFERENCE SIGNS LIST 1 robot hand
2 base
3, 4 finger mechanism
11, 12 motor
15, 16 rotating shaft
19, 20 fingertip portion
21 driving link
22 driven link
23 intermediate link
38 joint member
41 first parallel link
49 holding member
52 second parallel link
101 robot hand
102 base
103, 104 finger mechanism
113, 114 fingertip portion
121 driving link
122 driven link
123 intermediate link

The invention claimed is:

1. A robot hand configured such that a plurality of finger mechanisms are disposed on a base and operate so as to cause fingertip portions thereof to get close to each other and separate from each other, wherein:
at least one of the plurality of finger mechanisms comprises a Chebychev link mechanism including a driving link configured to be rotated about a base end portion thereof supported by the base, a driven link having a base end portion coupled to the base so as to be swingable, and an intermediate link having a base end portion coupled to a tip end portion of the driving link so as to be swingable and a center portion coupled to a tip end portion of the driven link so as to be swingable; and
the fingertip portion is provided at a tip end portion of the intermediate link,
wherein the driving link is configured to be rotatable in a predetermined angular range such that a movement trajectory of the fingertip portion of the finger mechanism constituted by the Chebychev link mechanism corresponds to a straight portion of a circumferential movement trajectory along which the intermediate link as the Chebychev link mechanism is able to move, and
wherein the at least one of the plurality of finger mechanisms is capable of moving closer to or separate from at least one other of the plurality of finger mechanisms using the straight portion of the circumferential movement trajectory along its respective Chebychev link mechanism.

2. A robot hand configured such that a plurality of finger mechanisms are disposed on a base and operate so as to cause fingertip portions thereof to get close to each other and separate from each other, wherein:
at least one of the plurality of finger mechanisms comprises a Chebychev link mechanism including a driving link configured to be rotated about a base end portion thereof supported by the base, a driven link having a base end portion coupled to the base so as to be swingable, and an intermediate link having a base end portion coupled to a tip end portion of the driving link so as to be swingable and a center portion coupled to a tip end portion of the driven link so as to be swingable; and
the fingertip portion is provided at a tip end portion of the intermediate link, wherein the finger mechanism constituted by the Chebychev link mechanism further includes: a joint member disposed at a coupled portion where the driven link and the intermediate link are coupled to each other; a first parallel link arranged in parallel with the driven link and coupled to the base and the joint member so as to be swingable; a holding member coupled to the tip end portion of the intermediate link so as to be swingable and configured as the fingertip portion; and a second parallel link arranged in parallel with the intermediate link and coupled to the joint member and the holding member so as to be swingable, wherein the at least one of the plurality of finger mechanisms is capable of moving closer to or separate from at least one other of the plurality of finger mechanisms using a straight portion of a circumferential movement trajectory along its respective Chebychev link mechanism.

3. The robot hand according to claim 2, wherein at least one of the driven link, the intermediate link, or the first parallel link includes a pair of side wall portions sandwiching the joint member, and the joint member is supported by the pair of side wall portions from both sides thereof.

4. The robot hand according to claim 2, wherein at least one of the intermediate link or the second parallel link includes a pair of side wall portions sandwiching the holding member, and the holding member is supported by the pair of side wall portions from both sides thereof.

5. The robot hand according to claim 2, wherein the holding member extends from the tip end portion of the intermediate link to a side where another one of the finger mechanisms is arranged.

* * * * *